United States Patent
Nishiuchi et al.

(10) Patent No.: US 10,782,444 B2
(45) Date of Patent: Sep. 22, 2020

(54) MULTIPLE-OPTICAL-AXIS PHOTOELECTRIC SENSOR

(71) Applicant: OMRON Corporation, Kyoto-shi, Kyoto (JP)

(72) Inventors: Satoshi Nishiuchi, Takatsuki (JP); Tetsuya Fukumoto, Kusatsu (JP); Nobuchika Takiguchi, Moriyama (JP); Takamasa Yamaji, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 326 days.

(21) Appl. No.: 15/629,935

(22) Filed: Jun. 22, 2017

(65) Prior Publication Data
US 2018/0017706 A1   Jan. 18, 2018

(30) Foreign Application Priority Data

Jul. 13, 2016 (JP) .................................. 2016-138846

(51) Int. Cl.
*G01J 1/42* (2006.01)
*G01V 8/20* (2006.01)

(52) U.S. Cl.
CPC ...................................... *G01V 8/20* (2013.01)

(58) Field of Classification Search
CPC .......... G01V 8/20; G01V 8/10; G08B 13/181; G08B 13/183; F16P 3/144
(Continued)

(56) References Cited

U.S. PATENT DOCUMENTS

2005/0205576 A1* 9/2005 Bednara ............... H05K 5/0221
  220/328
2006/0065818 A1* 3/2006 Shimokawa ............. G01V 8/20
  250/221

(Continued)

FOREIGN PATENT DOCUMENTS

EP  2461340 A1  6/2012
JP  S63-221652 A  9/1988
(Continued)

OTHER PUBLICATIONS

Extended European search report dated Dec. 11, 2017 in the counterpart European patent application.
(Continued)

*Primary Examiner* — Georgia Y Epps
*Assistant Examiner* — Kevin Wyatt
(74) *Attorney, Agent, or Firm* — Metrolex IP Law Group, PLLC

(57) ABSTRACT

A light projector and a light receiver each includes a case body, a light transmission plate closing an opening in a front face of the case body, and a pair of caps closing openings in end faces of the case body. The case body includes first supports supporting side edges of the light transmission plate, the caps respectively include second supports supporting ends of the light transmission plate, the light transmission plate is supported by the first supports and the second supports with an elastic member interposed between the light transmission plate and the first and second supports, and the cap is fixed to the case body while the seal member abutting on the end face of the case body is interposed between the cap and the case body. A cured liquid sealing agent is interposed between leading ends of the seal member and the elastic member.

6 Claims, 21 Drawing Sheets

(58) Field of Classification Search
USPC .................................. 250/559.12, 559.13
See application file for complete search history.

(56) References Cited

U.S. PATENT DOCUMENTS

| | | | |
|---|---|---|---|
| 2010/0214732 A1* | 8/2010 | Charles .................. | H05K 5/061 361/679.33 |
| 2011/0049814 A1* | 3/2011 | Iwase ...................... | F16J 15/14 277/628 |
| 2012/0112049 A1 | 5/2012 | Shimokawa et al. | |
| 2015/0204040 A1* | 7/2015 | Knezevich .............. | E04H 9/145 405/114 |
| 2017/0115429 A1* | 4/2017 | Rossetti .................. | G01V 8/20 |

FOREIGN PATENT DOCUMENTS

| | | | |
|---|---|---|---|
| JP | H08-100451 A | 4/1996 | |
| JP | 2002-75149 A | 3/2002 | |
| JP | 2006-155902 A | 6/2006 | |
| JP | 5141825 B2 | 2/2013 | |

OTHER PUBLICATIONS

Office Action dated Mar. 3, 2020 in a counterpart Japanese patent application.

* cited by examiner

FIG. 2

MULTIPLE-OPTICAL-AXIS PHOTOELECTRIC SENSOR

CROSS-REFERENCE TO RELATED APPLICATION

This application is based on Japanese Patent Application No. 2016-138846 filed with the Japan Patent Office on Jul. 13, 2016, the entire contents of which are incorporated herein by reference.

FIELD

The disclosure relates to a multiple-optical-axis photoelectric sensor in which plural optical axes are set between a light projector and a light receiver, the light projector and the light receiver being disposed opposite to each other, and a light shielding state in each optical axis is detected to detect an object.

BACKGROUND

A light projector or a light receiver of a multiple-optical-axis photoelectric sensor has a configuration in which plural optical units including optical elements and a control board are accommodated in a rectangular-solid casing. The casing is mainly constructed with a case body including openings in a front face and both end faces, a pair of caps that closes the openings in both the end faces of the case body, and a light transmission plate that closes the opening in the front face of the case body.

When the multiple-optical-axis photoelectric sensor is installed in a place where dust or liquid is scattered, there is a risk that the dust or liquid invades in the casing to cause a malfunction. For this reason, it is necessary to seal the casing such that the dust or liquid does not invade in the casing, and the pair of caps and the light transmission plate are fixed to the case body such that a gap is not generated. For example, the pair of caps is fixed to both ends of the case body with a rubber packing interposed therebetween, which allows the pair of caps to come into close contact with both the ends of the case body without generating a gap therebetween.

On the other hand, there is proposed a method for allowing the light transmission plate to come into close contact with a pair of supports along both side edges of the opening in the front face of the case body without generating a gap therebetween by fixing the light transmission plate to both the supports of the case body using a double-sided adhesive tape (for example, see JP-A-2002-75149). There is also proposed a method for fixing the light transmission plate to each support of the case body with an elastic member interposed therebetween (for example, see Japanese Patent No. 5141825). In Japanese Patent No. 5141825, the light transmission plate is longer than the case body, and supported by each support of the case body and a support of each cap with an elastic member interposed therebetween. The light transmission plate is fixed to the supports so as to be pressed against the elastic member, so that the light transmission plate and each support are brought into close contact with each other by the compressed elastic member without generating a gap between the light transmission plate and each support.

However, in JP-A-2002-75149, when the double-sided adhesive tape is contaminated with chemicals, the close contact between the light transmission plate and the case body can hardly be maintained because the double-sided adhesive tape has a weak chemical-resistant property, and there is a risk that the casing cannot stably be sealed.

In Japanese Patent No. 5141825, the gap between the case body and each cap can be sealed well by the rubber packing, and the gap between the light transmission plate and the case body and the gap between the light transmission plate and each cap can be sealed well by the elastic member. However, when the case body, the light transmission plate, and the cap are assembled, there is a risk of generating minute gaps such as a gap caused by position deviation or thermal expansion and contraction of the seal member and/or the elastic member and an inevitable gap at joints among the case body, the light transmission plate, and the cap, and there is a risk that the casing cannot stably be sealed. However, in Japanese Patent No. 5141825, this point is overlooked, and there is still room for improvement.

SUMMARY

An embodiment of the present invention has been made by focusing on the above problem, and an object of an embodiment of the present invention is to provide a seal structure that stably seals the casing of the light projector and the light receiver.

One or more embodiments relate to a multiple-optical-axis photoelectric sensor including a light projector and a light receiver, in which each of the light projector and the light receiver may include at least: a case body including openings in both end faces in a longitudinal direction and a front face through which light is passed; a light transmission plate that closes the opening in the front face of the case body, the light transmission plate being longer than the case body; and a pair of caps that closes the openings in the end faces of the case body.

In the multiple-optical-axis photoelectric sensor, the case body may include a pair of first supports that partially support both side edges of the light transmission plate, the caps respectively may include second supports continuous with the pair of first supports, the second supports supporting portions of the light transmission plate protruding from the end faces of the case body, the light transmission plate may be supported by the pair of first supports and the pair of second supports while an elastic member may be interposed between the light transmission plate and the pair of first supports and the pair of second supports, the caps may be fixed to the case body while a seal member abutting on the end face of the case body may be interposed between each of the caps and the case body, and a cured liquid sealing agent may be interposed between leading ends of the seal member and the elastic member.

In the multiple-optical-axis photoelectric sensor having the above configuration, each cap may be fixed to the case body without generating the gap therebetween by the seal member, and the light transmission plate may be fixed to the case body without generating the gap therebetween by the elastic member. Additionally, the seal member between the case body and each cap and the elastic member between the light transmission plate and the case body may be integrally connected to each other by the cured liquid sealing agent. Therefore, the light transmission plate, the case body, and each cap can be assembled one another without generating the gap in the joints among the light transmission plate, the case body, and each cap. Accordingly, the opening in the front face of the case body and the openings in the end faces may be surely closed, and the casing can stably be sealed. Further, the cured liquid sealing agent may be applied and cured to connect the leading ends of the seal member and the elastic member to each other, so that the work can easily be performed. The cured liquid sealing agent can be made to have various shapes and sizes, so that the leading ends of the seal member and the elastic member can surely and stably be connected to each other.

In another embodiment of the multiple-optical-axis photoelectric sensor, the leading ends of the seal member may not abut on the elastic member, and be connected to the elastic member by the cured liquid sealing agent. According to the multiple-optical-axis photoelectric sensor of the embodiment, unless the cured liquid sealing agent is interposed between the leading ends of the seal member and the elastic member, the incomplete contact between the leading ends of the seal member and the elastic member can easily be found. Therefore, a lack of the application of the cured liquid sealing agent can easily be found, and a defective product can be eliminated.

The leading ends of the seal member may abut on the elastic member. Also in this case, the cured liquid sealing agent may be interposed between the leading ends of the seal member and the elastic member (including surroundings of "between"), so that the leading ends of the seal member and the elastic member can surely be connected to each other using the cured liquid sealing agent even if the position deviation or thermal expansion and contraction of the seal member and/or the elastic member is generated.

In another embodiment of the multiple-optical-axis photoelectric sensor, a fitting groove in which the seal member may be fitted is provided in the cap, leading ends of the fitting groove may be communicated to the second support, and a space adjacent to the second support in the fitting groove may be filled with the cured liquid sealing agent. It may be preferable that the leading ends of the fitting groove are widely formed, and the leading ends of the seal member are leaned in to form the space filled with the cured liquid sealing agent at a position adjacent to the second support at the leading ends of the fitting groove. According to the multiple-optical-axis photoelectric sensor of the embodiment, the space may be formed in the fitting groove in which the seal member of the cap may be fitted at the position adjacent to the second support supporting the elastic member. Therefore, when the cured liquid sealing agent is applied to and cured in the space, the cured liquid sealing agent can surely be interposed between the leading ends of the seal member and the elastic member.

In another embodiment of the multiple-optical-axis photoelectric sensor, the seal member may be constructed with a cured liquid gasket. According to the multiple-optical-axis photoelectric sensor of the embodiment, because the seal member may be formed by the application and the curing of the liquid gasket, the work may be easily performed, and the productivity may be improved.

According to one or more embodiments, the light projector and the light receiver can stably be sealed.

BRIEF DESCRIPTION OF THE DRAWINGS

FIG. 2 is an exploded perspective view illustrating a casing constituting a light projector and a light receiver.

DETAILED DESCRIPTION

Hereinafter, a multiple-optical-axis photoelectric sensor according to an embodiment of the present invention will be described with reference to the drawings.

Figure 1:
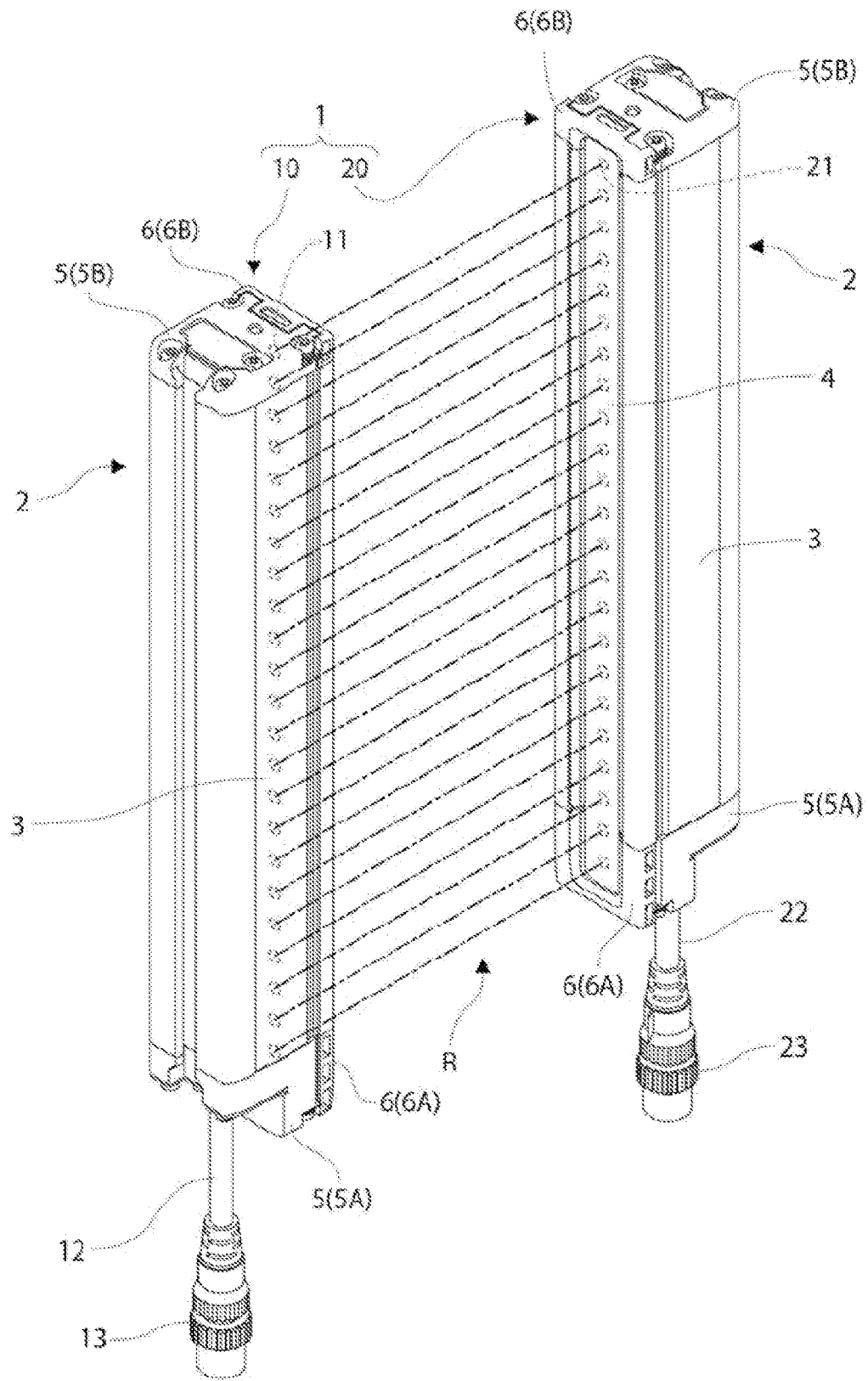
FIG. 1 is a perspective view illustrating a multiple-optical-axis photoelectric sensor according to an embodiment of the present invention.

FIG. 1 illustrates an appearance of a multiple-optical-axis photoelectric sensor 1. The multiple-optical-axis photoelectric sensor 1 has a configuration in which a light projector 10 and a light receiver 20 are disposed opposite to each other with a predetermined interval. At this point, it is assumed that a front (front face) is a side on which the light projector 10 and the light receiver 20 are opposite to each other, and that a rear (rear face) is an opposite side to the front.

In each of the light projector 10 and the light receiver 20, an optical unit (not illustrated) constructed with an optical element (a light emitting element 11 in the light projector 10, and a light receiving element 21 in the light receiver 20) and a lens and a control board (not illustrated) are accommodated in a substantially rectangular-solid casing 2. Plural optical units are accommodated in the casing 2 while arrayed along a longitudinal direction of the casing 2. In the casings 2 of the light projector 10 and the light receiver 20, the front faces opposite to each other are windows through which light is transmitted. Plural light emitting elements 11 and plural light receiving elements 21 are aligned with each other in a one-on-one manner while light projection surfaces or light receiving surfaces of the light emitting elements 11 or light receiving elements 21 are opposite to the windows, thereby setting a two-dimensional object detection area R constructed with plural optical axes. In the light projector 10 and the light receiver 20, connecting cords 12, 22 are respectively drawn from one end of the casing 2.

Figure 2:
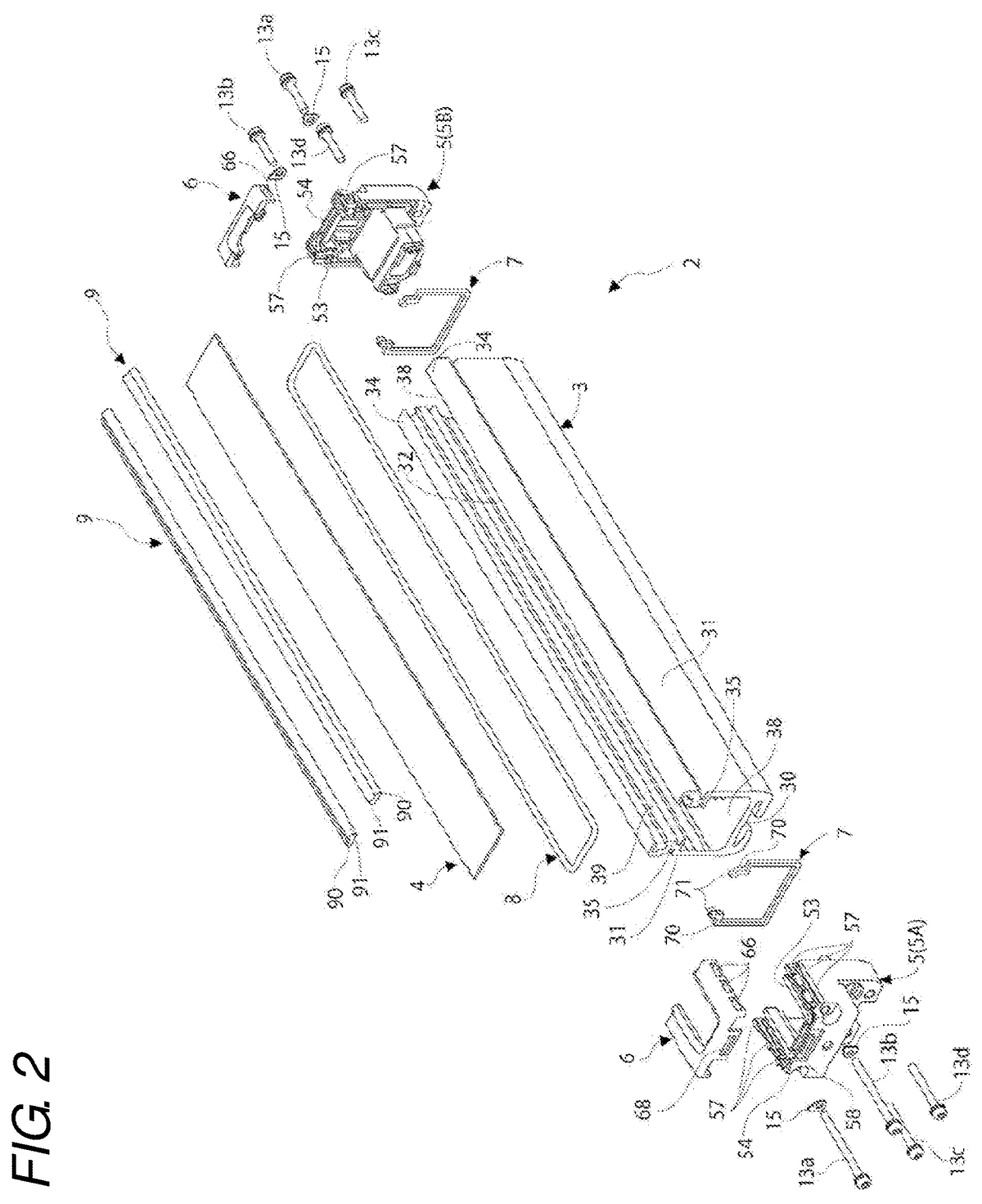
Figure 3:
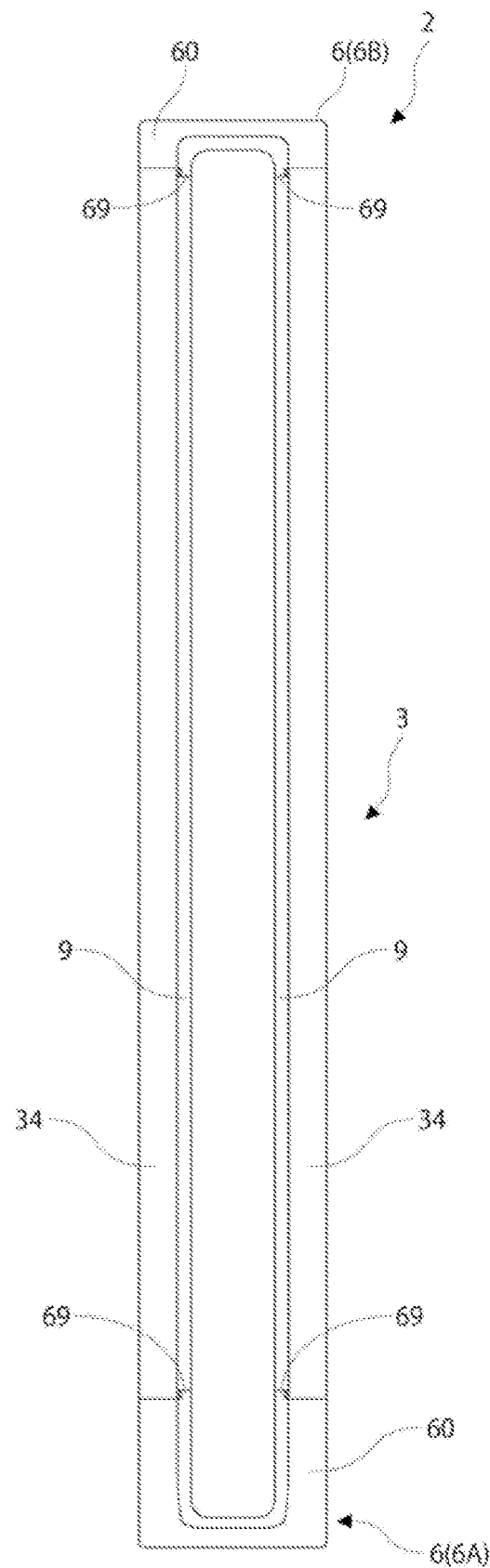
FIG. 3 is a front view of the casing.
Figure 4:
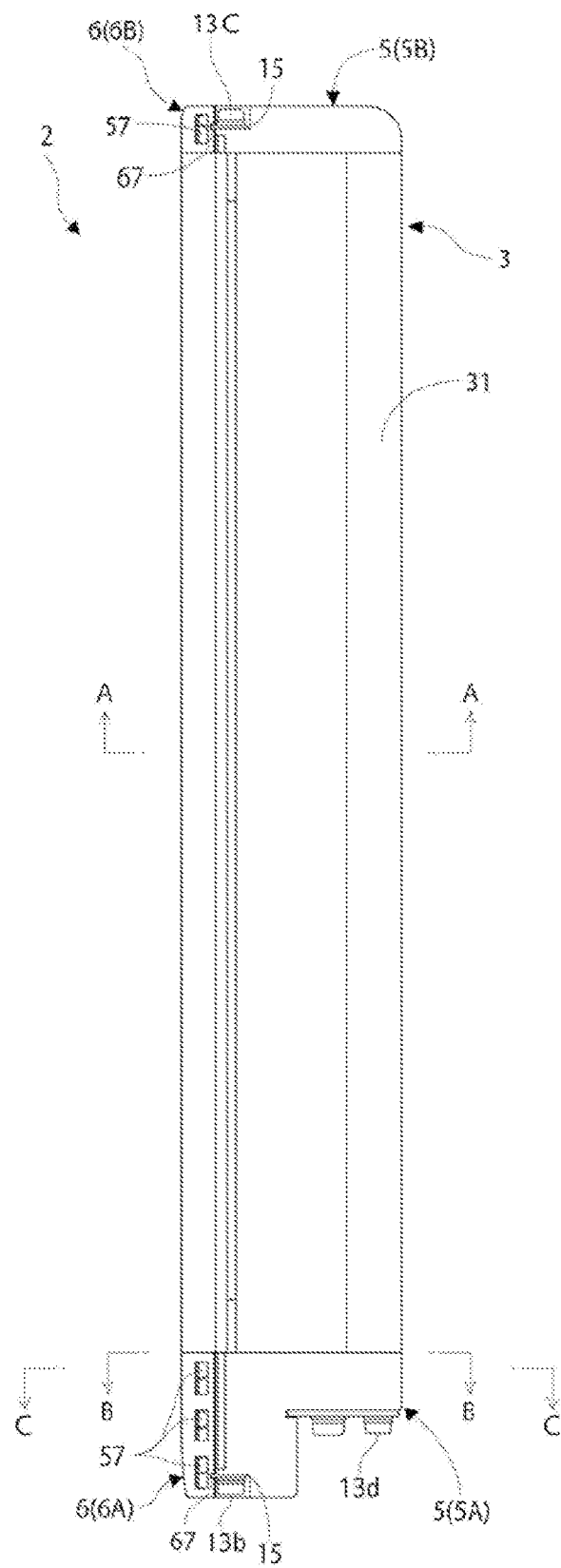
FIG. 4 is a side view of the casing.
Figure 5:
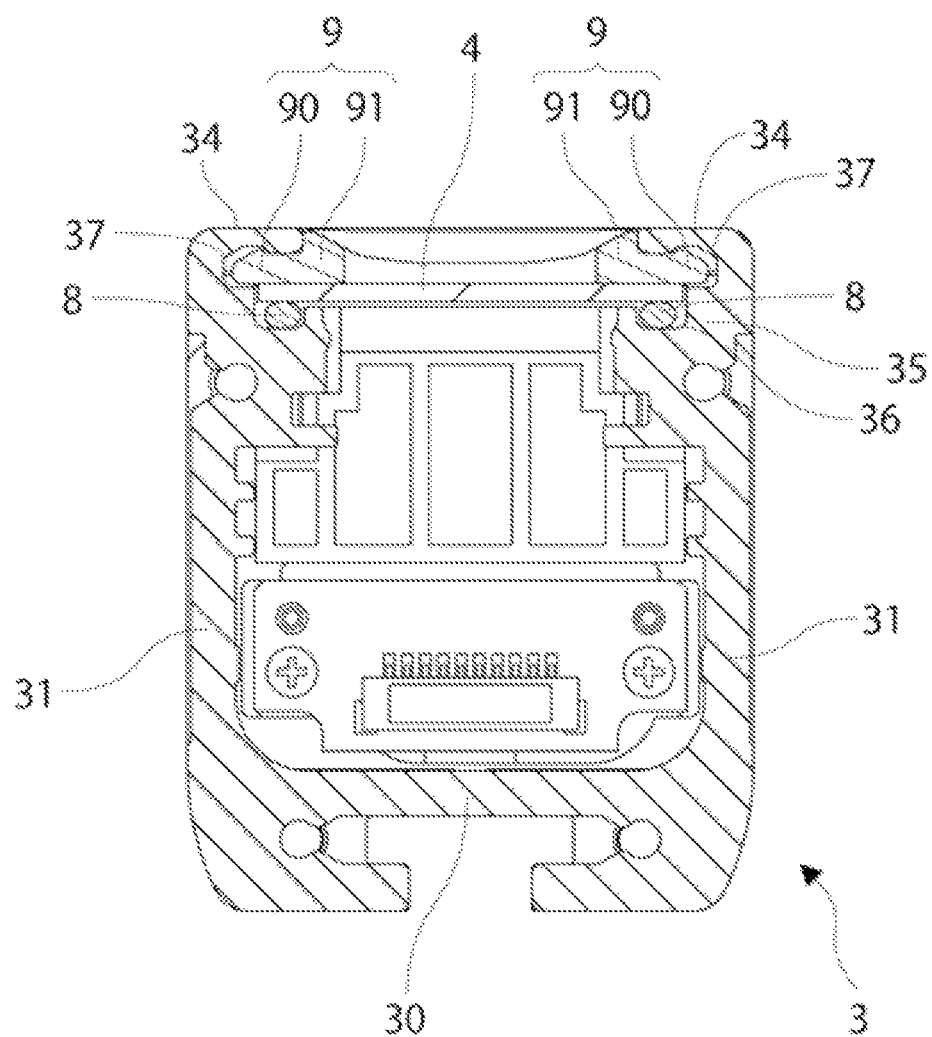
FIG. 5 is a sectional view taken on a line A-A in FIG. 4.
Figure 6:
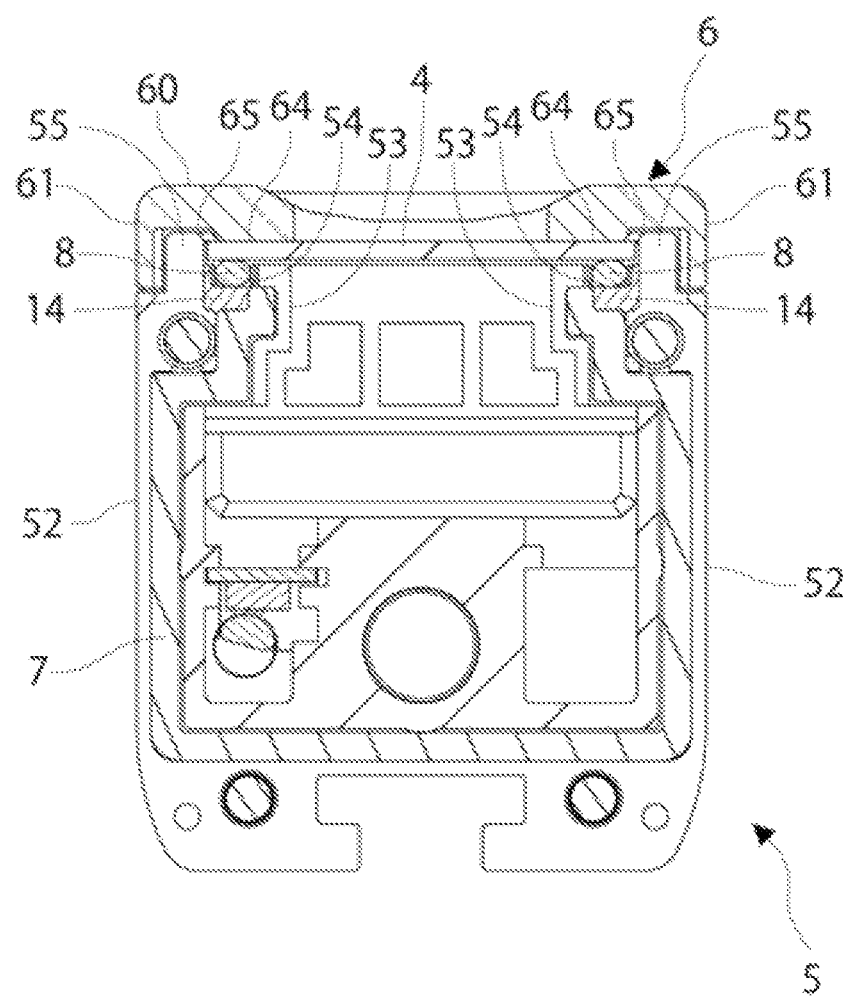
FIG. 6 is a sectional view taken on a line B-B in FIG. 4.
Figure 7:
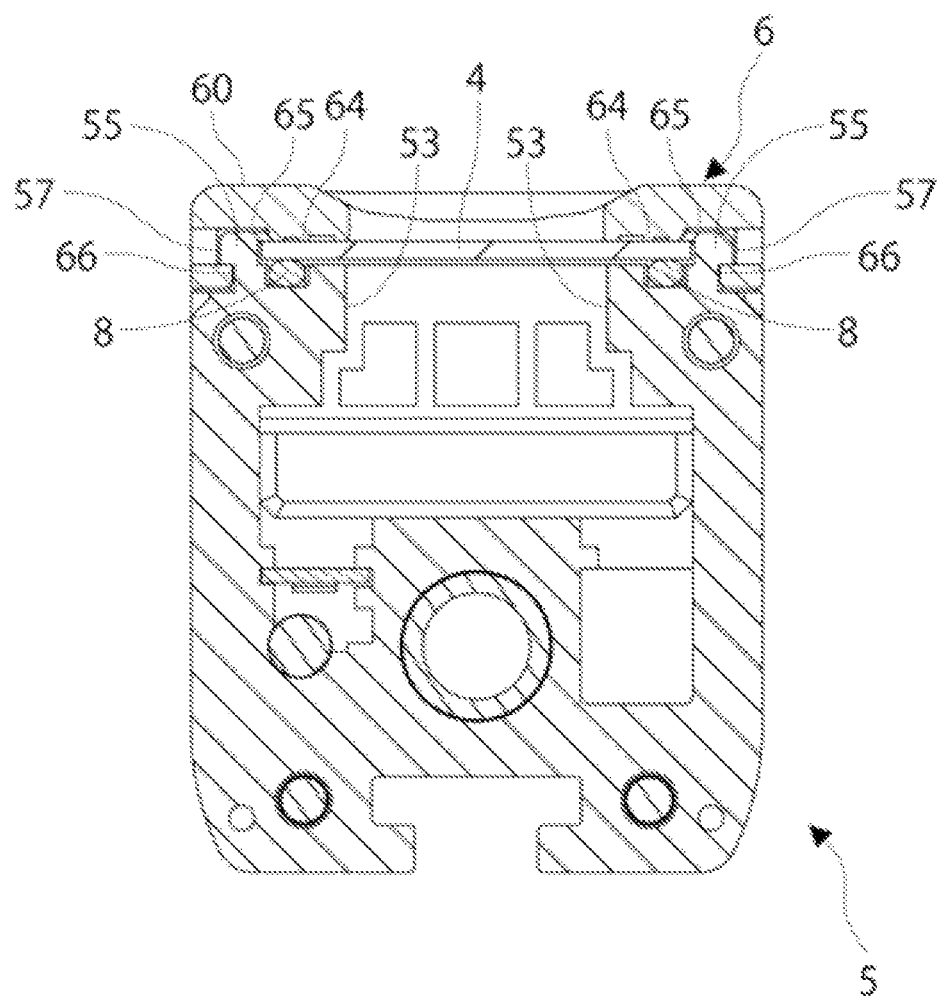
FIG. 7 is a sectional view taken on a line C-C in FIG. 4.

FIG. 2 is an exploded perspective view of the casing 2 constituting the light projector 10 and the light receiver 20, and FIGS. 3 and 4 are a plan view and a side view of the casing 2, respectively. FIGS. 5 to 7 illustrate internal configurations at positions in the longitudinal direction of the casing 2. The front face side of the casing 2 is oriented upward in FIGS. 2, and 5 to 7.

The casing 2 includes a case body 3, a light transmission plate 4, a pair of caps 5, and a pair of cap covers 6. The case body 3 includes openings 38 at end faces in the longitudinal direction and an opening 39 in the front face through which the light is transmitted. The light transmission plate 4 closes the opening 39 in the front face of the case body 3. The caps 5 close the openings 38 at both the end faces of the case body 3. Each cap 5 is formed such that the front face of the cap 5 is lower than the front face of the case body 3, and the cap cover 6 is attached onto the front face side of the corresponding cap 5 while being slidable in the longitudinal direction of the case body 3. The casing 2 also includes a restriction member 15 that restricts sliding of the cap cover 6 attached to the cap 5 with respect to the cap 5.

The caps 5 are fixed to both ends of the case body 3 in the pressed state using four screw members 13a to 13d such as a screw, a bolt, and a vis. The screw members 13a to 13d are screwed from the caps 5 toward the case body 3. A seal member 7 such as a rubber packing is interposed between the end face of each cap 5 and both the end faces of the case body 3. Each cap 5 is fixed to the case body 3 with no gap while the seal member 7 abutting on the end face of the case body 3 is interposed between the cap 5 and the case body 3, and the opening 38 at the end face of the case body 3 is closed.

Although described in detail later, the light transmission plate 4 is fixed to the case body 3 and each cap 5 using a ring-shaped elastic member 8, a pressing member 9, and each cap cover 6, and closes the opening 39 in the front face of the case body 3. Each member constituting the casings 2 of the light projector 10 and the light receiver 20 will be described in detail below.

Figure 8:
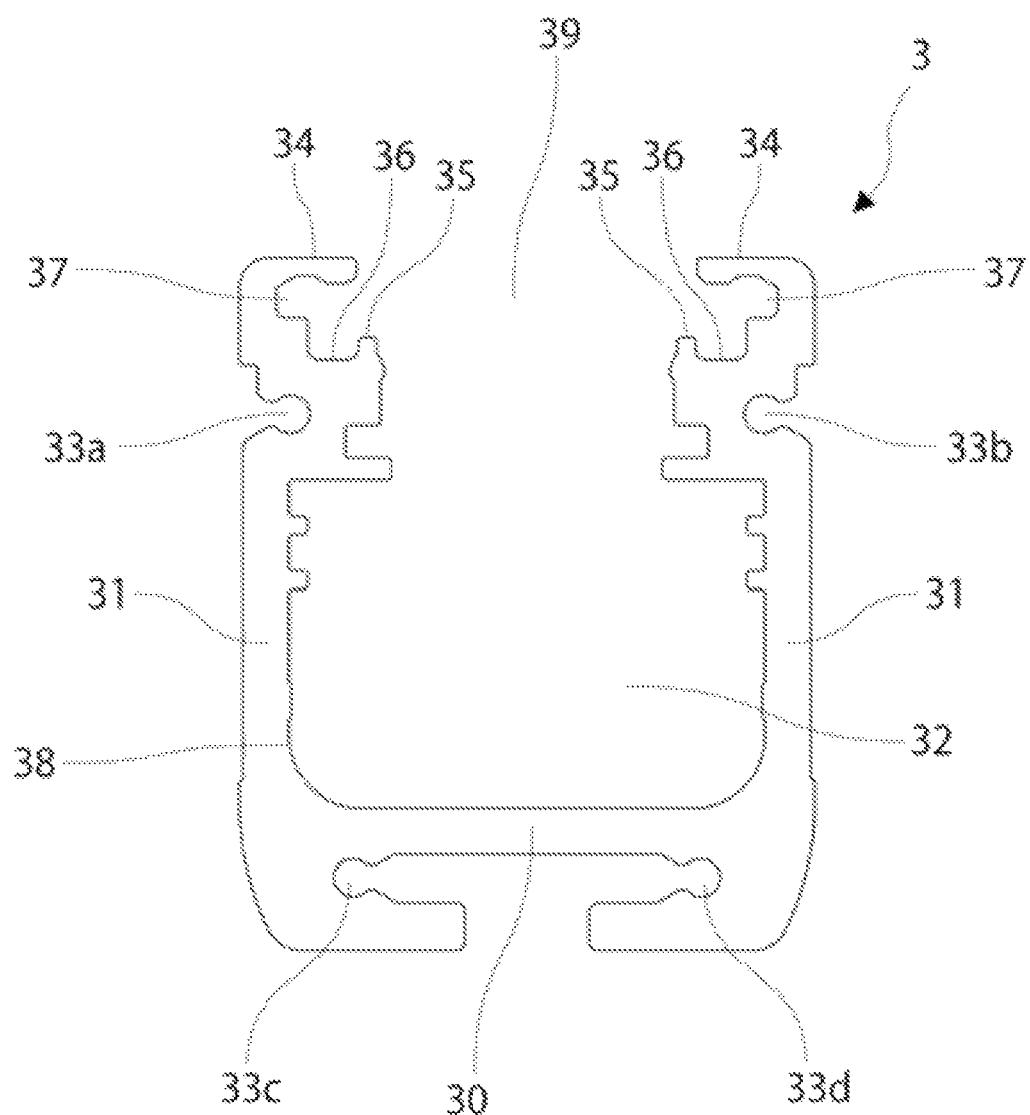
FIG. 8 is a plan view of a frame body.

As illustrated in FIGS. 2 and 8, for example, the long case body 3 is made of metal, and formed into a substantial U-shape in section. The case body 3 is mainly constructed with a rear wall 30 and a pair of sidewalls 31, 31 integrally provided at both side edges of the rear wall 30, and the plural optical units and the control board are accommodated in a cavity 32 of the case body 3.

Screw holes 33a to 33d, in which the screw members 13a to 13d are screwed, are made in the sidewalls 31 and the rear wall 30 to fix the cap 5 to the case body 3.

A belt-shaped frame 34 that is bent at a right angle relative to the sidewall 31 is provided at a front end of each sidewall 31. The front face of the case body 3 is opened while the pair of frames 34 is left at both the side edges. A pair of first supports 35 projecting inward is provided in an inner surface of each sidewall 31 over a total length of the sidewall 31, and both the side edges of the light transmission plate 4 is partially supported by the first supports 35. An accommodation groove 36 is provided in each first support 35 over a total length of the first support 35. The elastic member 8 is accommodated in the accommodation groove 36, and the light transmission plate 4 is supported by the first supports 35 with the elastic member 8 interposed therebetween. A recess 37 is provided over a total length of each sidewall 31 between the frame 34 and the first support 35 in the inner surface of the sidewall 31, and a portion 90 of the pressing member 9 (to be described later) is inserted in the recess 37.

The pressing member 9 is a belt-shaped synthetic resin molding having flexibility, and is inserted in a gap between the frame 34 and the light transmission plate 4 as illustrated in FIGS. 2 and 5. The portion 90 of the pressing member 9 is inserted in the recess 37 of the sidewall 31 from the gap between the frame 34 of the case body 3 and the light transmission plate 4, and a portion 91 of the pressing member 9 is bulged higher than the portion 90 and abuts on a front end of each frame 34. Additionally, the portion 91 of the pressing member 9 reduces an exposed portion of the light transmission plate 4 to protect an optical surface.

When the pressing member 9 is inserted between each frame 34 of the case body 3 and the light transmission plate 4, a portion supported by the case body 3 in the light transmission plate 4 is pressed on the elastic member 8 against repulsive force (restoring force) of the elastic member 8. The light transmission plate 4 is pressed by the pressing member 9, and fixed to the first supports 35 of the case body 3. At this point, the compressed elastic member 8 blocks communication between both the side edges of the opening 39 in the front face of the case body 3 and the cavity 32 of the case body 3. Therefore, the opening 39 in the front face of the case body 3 is closed, and therefore the casing 2 is sealed. The pressing member 9 is formed slightly shorter than the case body 3, and both ends of the case body 3 are not aligned with both ends of the pressing member 9.

Figure 9:
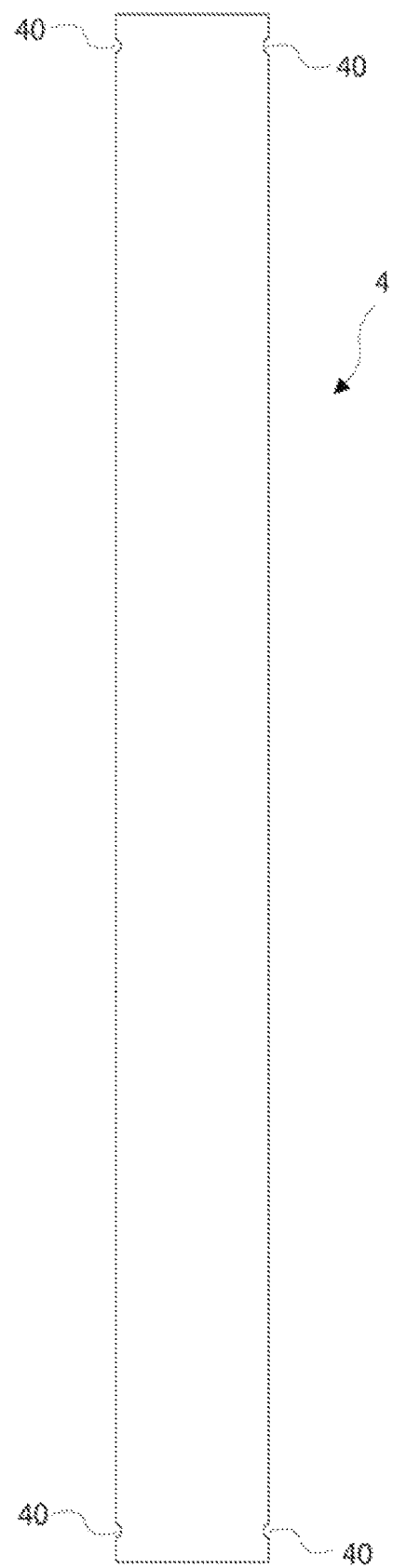
FIG. 9 is a front view of a light transmission plate.
Figure 10:
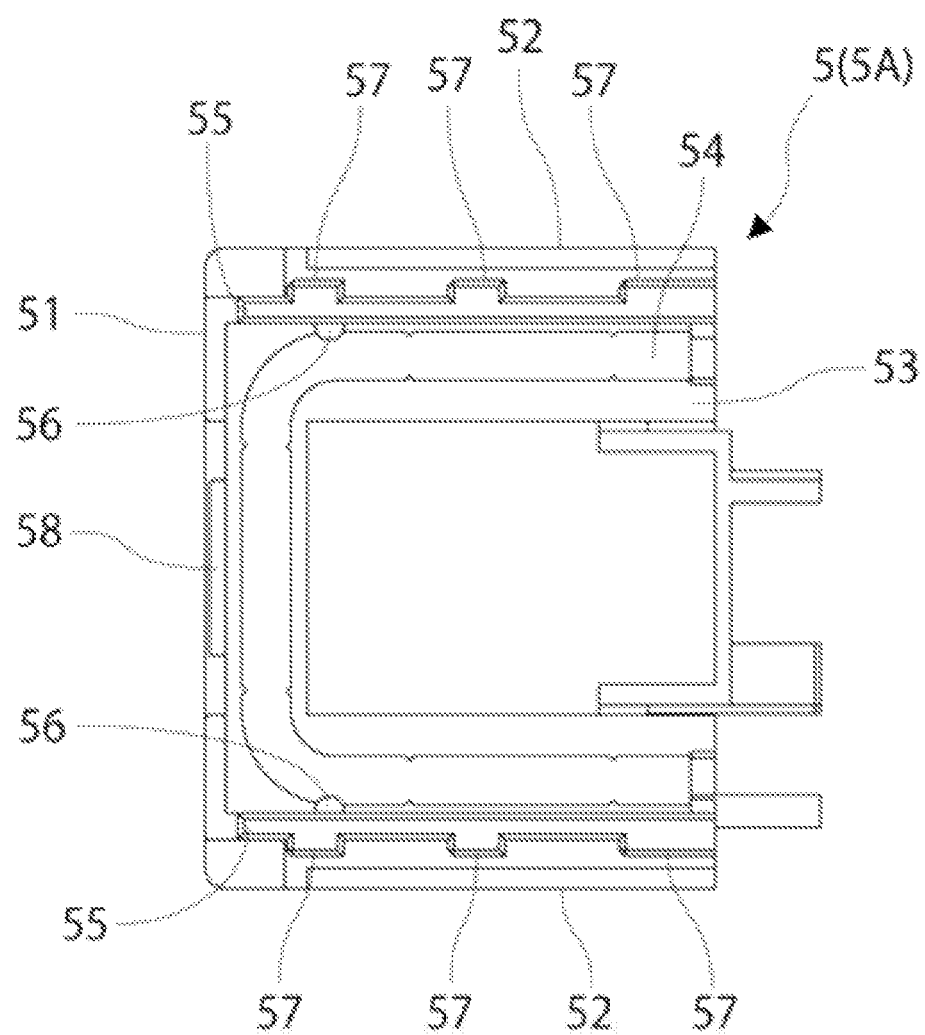
FIG. 10 is a front view of a cap.
Figure 11:
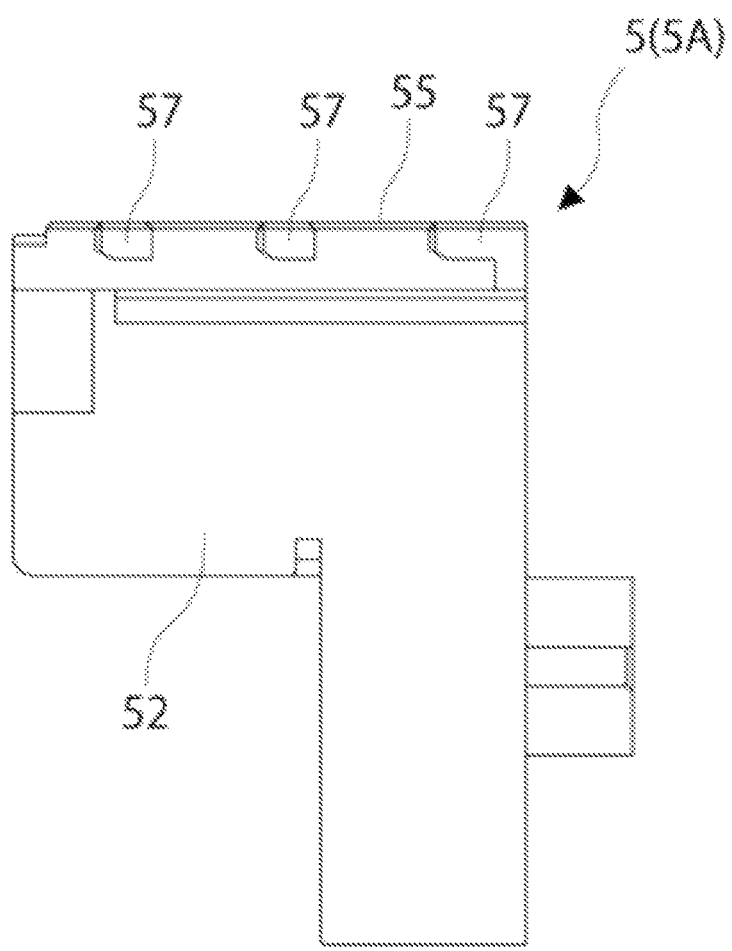
FIG. 11 is a side view of the cap.

As illustrated in FIGS. 2 and 9, the light transmission plate 4 is constructed with a transparent or translucent synthetic resin plate, such as acrylic plate, which has a rectangular external form. The light transmission plate 4 is formed so as to be wider than the opening 39 in the front face of the case body 3, and so as to be longer than the case body 3. The light transmission plate 4 is fixed to the case body 3 such that both the ends in the longitudinal direction of the light transmission plate 4 protrude from both the end faces of the case body 3, and both the ends of the light transmission plate 4 are fixed to the pair of caps 5.

Figure 20:
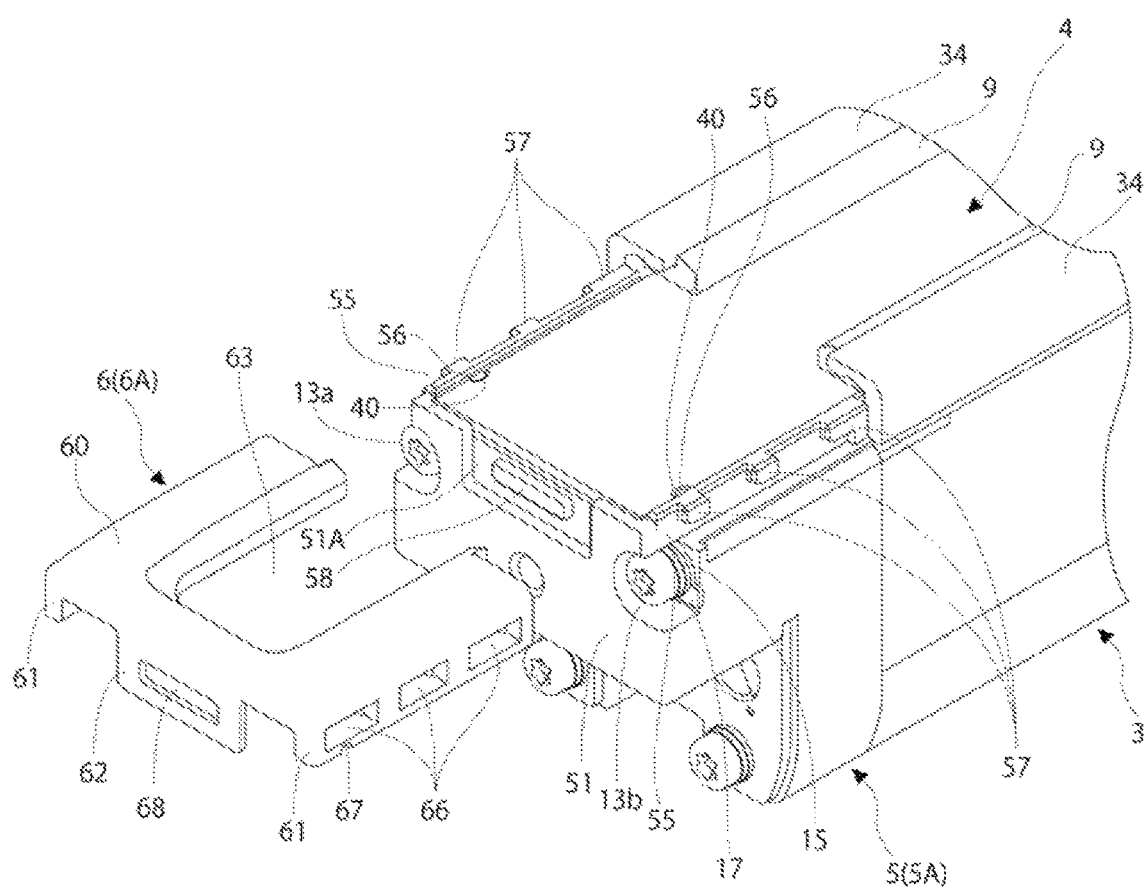
FIG. 20 is an enlarged perspective view illustrating a main part during a process of attaching the cap cover to the cap.

In both the side edges in a width direction of the light transmission plate 4, a total of four notches 40 in each of which the side edge is notched inward is provided at a position (a position close to both the end edges of the light transmission plate 4) protruding from both the end faces of the case body 3. Although described in detail later, as illustrated in FIG. 20, the notch 40 engages with an engagement protrusion 56 provided in each cap 5 when the light transmission plate 4 is fixed to the case body 3 and each cap 5 to constitute an engagement unit (first engagement unit). The engagement unit restricts inward displacements of both the ends of the light transmission plate 4 fixed to each cap 5 in the longitudinal direction.

As illustrated in FIGS. 2, and 10 to 13, the cap 5 is constructed with a synthetic resin molding having a substantial U-shape in section, the cap 5 being suitable for the substantially U-shaped end face of the case body 3. For the cap 5, a cap 5A fixed to one end of the case body 3 differs from a cap 5B fixed to the other end of the case body 3 in the shape. Compared with the cap 5B, the cap 5A has the shape in which a first half on the front face side protrudes from a second half in the longitudinal direction of the casing 2. A plug (not illustrated) is fixed to the cap 5A, and connectors 13, 23 (see FIG. 1) are attached to a leading end of the cords 12, 22 (see FIG. 1) drawn from the plug. A socket (not illustrated) corresponding to the plug is fixed to the cap 5B. Although the cap 5A will mainly be described below, the cap 5B has the main configuration identical to that of the cap 5A, and the common configuration is designated by the same reference sign.

Through-holes 50a to 50d, through which the screw members 13a to 13d are pierced, are made in the cap 5 to fix the cap 5 to the case body 3. The through-holes 50a to 50d extend from the side of an end wall 51 of the cap 5 to the end face side.

A second support 53 having a substantially U-shaped external form is provided in the front face of the cap 5. The front face of the cap 5 is opened except for the second support 53.

The second support 53 is continuous with the pair of first supports 35 of the case body 3, and partially supports the end edge in the longitudinal direction of the light transmission plate 4 and both the side edges continuous with the end edge. An accommodation groove 54 having a substantially U-shaped external form is provided over a whole periphery of the second support 53. The accommodation groove 54 is continuous with the accommodation groove 36 of the first support 35, and the pair of accommodation grooves 36 and the pair of accommodation grooves 54 form a loop-shaped passage to accommodate the ring-shaped elastic member 8.

The ends of the light transmission plate 4 are supported by the second support 53 of each cap 5 with the elastic member 8 interposed therebetween. When the cap cover 6 is attached to each cap 5 (see FIGS. 6 and 7), the ends of the light transmission plate 4 are pressed on the elastic member 8 against the repulsive force (restoring force) of the elastic member 8. The ends of the light transmission plate 4 are pressed by the cap cover 6, and fixed to the second support 53 of each cap 5. At this point, the compressed elastic member 8 blocks the communication between both the end edges in the longitudinal direction of the opening 39 in the front face of the case body 3 and the cavity 32 of the case body 3. Therefore, the opening 39 in the front face of the case body 3 is closed, and therefore the casing 2 is sealed.

Guide walls 55 are provided at both side edges of the second support 53. The guide wall 55 is formed such that the sidewall 52 of the cap 5 protrudes forward from the second support 53, and the guide wall 55 acts as the positioning in the width direction of the light transmission plate 4 supported by the second support 53. In the embodiment, the guide wall 55 also protrudes forward from the end wall 51 of the cap 5, has the substantial L-shape in section so as to be continuous with a part of the end wall 51, and acts as the positioning at which the end edge in the longitudinal direction of the light transmission plate 4 supported by the second support 53 abut. The guide wall 55 extending from the end wall 51 of the cap 5 is adjacent to the accommodation groove 54.

The engagement protrusion 56 protruding inward is provided in an inner surface of each guide wall 55. As illustrated in FIG. 20, the engagement protrusion 56 engages with the notch 40 provided at each side edge of the light transmission plate 4 supported by the second support 53, and constitutes the first engagement unit together with the notch 40.

The multiple-optical-axis photoelectric sensor 1 is placed in various situations depending on the installation environment, and there is a risk of the thermal contraction of the light transmission plate 4 when the multiple-optical-axis photoelectric sensor 1 is placed in the high-temperature situation. When the light transmission plate 4 is shortened due to the thermal contraction, the ends of the light transmission plate 4 are displaced inward in the longitudinal direction. Therefore, in the second support 53 of each cap 5, the elastic member 8 can insufficiently be covered at the ends of the light transmission plate 4, and the elastic member 8 is exposed. When the elastic member 8 is exposed by the inward displacements of the ends of the light transmission plate 4 in the longitudinal direction in association with the thermal contraction of the light transmission plate 4, even if the ends of the light transmission plate 4 are pressed by each cap cover 6, the elastic member 8 is not compressed, and therefore the opening 39 in the front face of the case body 3 cannot be closed well. On the other hand, when the engagement protrusion 56 provided in each cap 5 engages with the notch 40 at each side edge of the light transmission plate 4, even if the light transmission plate 4 is placed in the high-temperature situation, the ends of the light transmission plate 4 are caught by the engagement protrusions 56, and the inward displacement of the ends of the light transmission plate 4 is restricted in the longitudinal direction. Therefore, the thermal contraction of the light transmission plate 4 is suppressed. Additionally, because the light transmission plate 4 is pressed against the elastic member 8, the inward displacements of the ends of the light transmission plate 4 are restricted in the longitudinal direction by friction force generated between the light transmission plate 4 and the elastic member 8, and also the length of the light transmission plate 4 is maintained. Thus, in the embodiment, even if the multiple-optical-axis photoelectric sensor 1 is used in the high-temperature situation, the first engagement unit prevents the thermal contraction of the light transmission plate 4, and the elastic member 8 can be compressed while sufficiently covered with the ends of the light transmission plate 4. Therefore, the opening 39 in the front face of the case body 3 is well closed.

A first protrusion 57 protruding outward is provided in an outer surface of each guide wall 55. In the embodiment, three first protrusions 57 are provided in the cap 5A at predetermined intervals, and one first protrusion 57 is provided in the cap 5B. There is no particular limitation to the number of first protrusions 57. One or plural first protrusions 57 may be provided, but preferably plural first protrusions 57 are provided. Although described in detail later, the first protrusion 57 constitutes an engagement unit (second engagement unit) together with a second protrusion 66 provided in the cap cover 6. In the engagement unit, the first protrusion 57 and the second protrusion 66 engage with each other to maintain the state in which the light transmission plate 4 is pressed by the cap cover 6, whereby the cap cover 6 is fixed to the cap 5.

A rectangular recessed area 51A recessed from other areas is provided in an outer surface of the end wall 51 of the cap 5 while being adjacent between the guide walls 55. A fitting protrusion 58 is provided in the recessed area 51A. In the embodiment, only one fitting protrusion 58 is provided. Alternatively, at least two fitting protrusions 58 may be provided. Although described in detail later, the fitting protrusion 58 also constitutes the engagement unit (second engagement unit) together with a fitting hole 68 made in the cap cover 6. In the engagement unit, the fitting protrusion 58 and the fitting hole 68 engage with each other to maintain the state in which the light transmission plate 4 is pressed by the cap cover 6, whereby the cap cover 6 is fixed to the cap 5.

In the cap 5, a fitting groove 59 in which the seal member 7 can be fitted is provided in the substantially U-shaped end face opposite to the end face of the case body 3. The fitting groove 59 has a substantially U-shaped external form, and a pair of leading ends of the fitting groove 59 is communicated with the accommodation groove 54 of the second support 53 in the front face of the cap 5. In the embodiment, the fitting groove 59 has a shape in which a portion 59A on each of both leading end sides is bent inward into an L-shape so as to avoid the through-holes 50a, 50b. A leading end 59B of the portion 59A is widely formed on both the leading end sides of the fitting groove 59.

Figure 21:
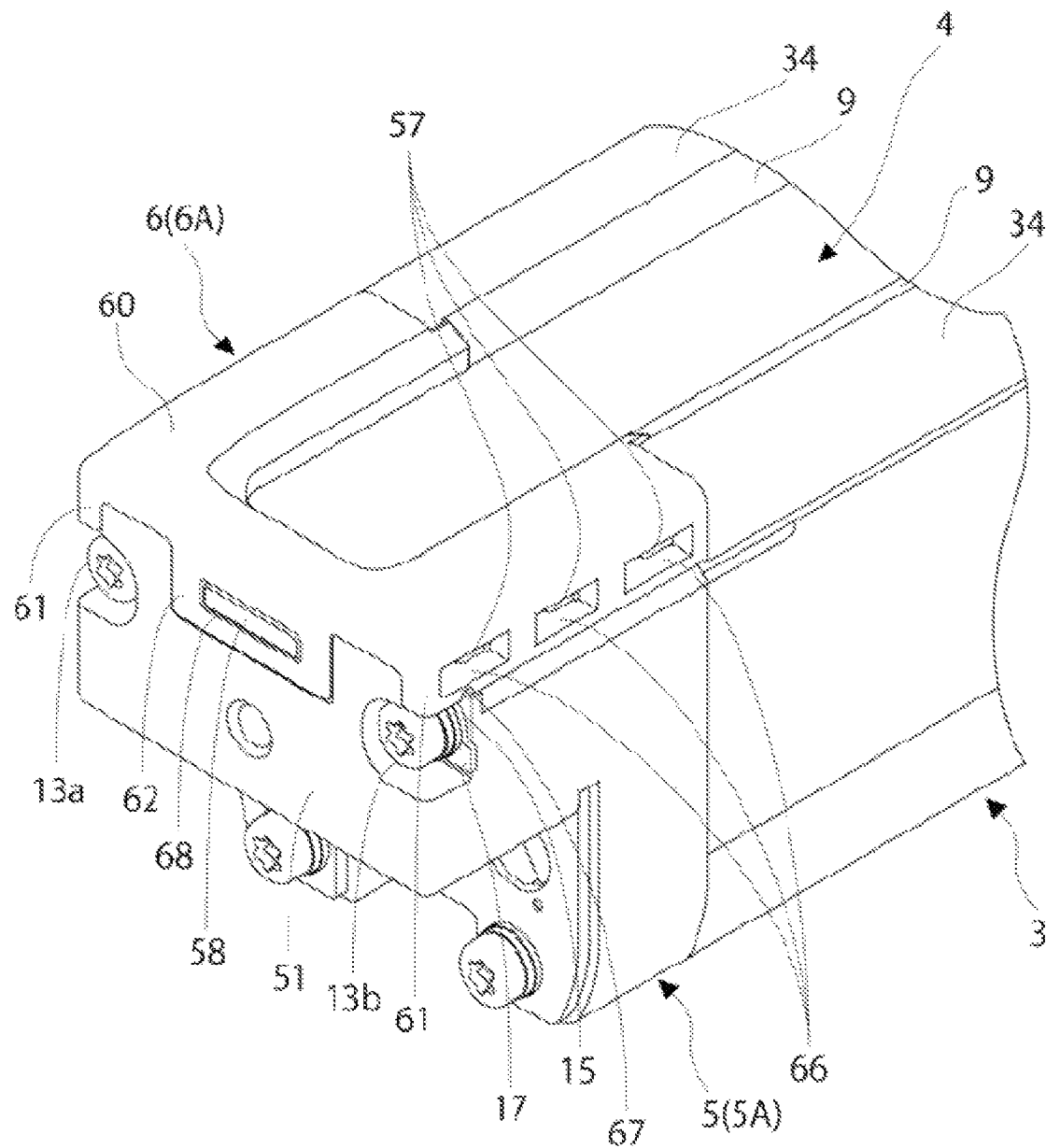
FIG. 21 is an enlarged perspective view illustrating the main part during the process of attaching the cap cover to the cap.

As illustrated in FIGS. 2, and 14 to 18, for example, the cap cover 6 is made of metal, and formed into a substantial U-shape in section. The cap cover 6 is mainly constructed with a front face 60, a pair of side faces 61, 61 integrally provided at both side edges of the front face 60, and an end face 62 integrally provided in the center in the width direction of the end edge of the front face 60. As illustrated in FIG. 20, the cap cover 6 is slid in a direction of an arrow X while the light transmission plate 4 and the elastic member 8 are sandwiched between the cap cover 6 and the cap 5, and the cap cover 6 is attached to the front face of the cap 5, which allows the ends of the light transmission plate 4 to be fixed to the cap 5 as illustrated in FIG. 21. At this point, the opening 63 in the front face of the cap cover 6 is closed by the light transmission plate 4.

In the cap cover 6, a cap cover 6A attached to the cap 5A at one end of the case body 3 differs from a cap cover 6B attached to the cap 5B at the other end of the case body 3 in the shape. The front face 60 of the cap cover 6A is formed longer than that of the cap cover 6B. Although the cap cover 6A will mainly be described below, the cap cover 6B has the main configuration identical to that of the cap cover 6A, and the common configuration is designated by the same reference sign.

The pair of side faces 61 moves along both the guide walls 55 of the cap 5 on the outsides of guide walls 55, whereby the cap cover 6 slides in the longitudinal direction of the case body 3. In a surface (rear face) of the front face 60 on the side opposite to the cap 5, width-direction central portions opposite to the ends of the light transmission plate 4 are bulged higher than width-direction side edges 65, thereby constituting a pressing unit 64. When the cap cover 6 is attached to the cap 5 while the elastic member 8 and the light transmission plate 4 are sandwiched between the cap cover 6 and the cap 5 (see FIG. 6), the side edges 65 in the rear face of the front face 60 come into contact with top faces of the guide walls 55. On the other hand, the pressing unit 64 abuts on the ends of the light transmission plate 4, and presses the ends of the light transmission plate 4 toward the second support 53. The pressing force of the pressing unit 64 fixes the light transmission plate 4 to the second support 53, and the light transmission plate 4 compresses the elastic member 8.

A second protrusion 66 protruding inward is provided in an inner surface of each side face 61. Three second protrusions 66 are provided in the cap cover 6A at predetermined intervals, and one second protrusion 66 is provided in the cap cover 6B. The number of second protrusions 66 corresponds to the number of first protrusions 57 of the corresponding cap 5. A long hole is made in each side face 61 at a position corresponding to the second protrusion 66.

The second protrusion 66 constitutes the engagement unit (second engagement unit) together with the first protrusion 57 provided in the cap 5. In the engagement unit, the second protrusion 66 and the first protrusion 57 engage with each other while the light transmission plate 4 is pressed by the cap cover 6, whereby the cap cover 6 is fixed to the cap 5. When the cap cover 6 is attached to the cap 5 while the elastic member 8 and the light transmission plate 4 are sandwiched between the cap cover 6 and the cap 5 (see FIG. 7), the second protrusion 66 engages with the first protrusion 57 of the guide wall 55 of the cap 5 from the back. Because the cap cover 6 presses the elastic member 8 toward the side (back) of the second support 53 with the light transmission plate 4 interposed therebetween, the repulsive force (restoring force) acts on the cap cover 6 from the elastic member 8 in a direction (forward) in which the cap cover 6 is separated from the cap 5. However, in the second engagement unit, the second protrusion 66 of the cap cover 6 and the first protrusion 57 of the cap 5 engage with each other, and the pressing unit 64 continuously presses the light transmission plate 4. Therefore, the cap cover 6 is fixed to the cap 5. Accordingly, the light transmission plate 4 can well press and compress the elastic member 8.

In each side face 61, a recessed groove 67 is formed in the rear face on the side opposite to the cap 5. Although described in detail later, the restriction member 15 is partially fitted in the recessed groove 67.

A long fitting hole 68 is made in the end face 62. The fitting hole 68 also constitutes the engagement unit (second engagement unit) together with the fitting protrusion 58 provided in the end wall 51 of the cap 5. In the engagement unit, the fitting hole 68 and the fitting protrusion 58 engage with each other while the light transmission plate 4 is pressed by the cap cover 6, whereby the cap cover 6 is fixed to the cap 5. When the cap cover 6 is attached to the cap 5 while the elastic member 8 and the light transmission plate 4 are sandwiched between the cap cover 6 and the cap 5, as illustrated in FIG. 20, the end face 62 of the cap cover 6 is accommodated in the recessed area 51A of the end wall 51 of the cap 5, and the fitting protrusion 58 is fitted in the fitting hole 68. In the second engagement unit, the fitting protrusion 58 of the cap 5 is fitted in the fitting hole 68 of the cap cover 6, and the pressing unit 64 continuously presses the light transmission plate 4. Therefore, the cap cover 6 is fixed to the cap 5. Therefore, the light transmission plate 4 can better press and compress the elastic member 8 together with the second engagement unit including the first protrusion 57 and the second protrusion 66.

In the end face of the front face 60 opposite to the end face of the case body 3, a pair of claws 69 is provided so as to protrude outward. The claw 69 is formed into the shape in which a portion 69A is bulged from a portion 69B. When the cap cover 6 is attached to the cap 5 while the elastic member 8 and the light transmission plate 4 are sandwiched between the cap cover 6 and the cap 5, the portion 69A of the claw 69 is inserted in the gap between the frame 34 of the case body 3 and the light transmission plate 4, and the end face of the portion 69B abuts on the end face of the pressing member 9 along the leading end of the frame 34.

The claw 69 is formed so as to be integral with the pressing unit 64. When the cap cover 6 is attached to the cap 5 while the elastic member 8 and the light transmission plate 4 are sandwiched between the cap cover 6 and the cap 5, the claw 69 abuts on the ends of the light transmission plate 4, presses the light transmission plate 4 toward the second support 53, and compresses the elastic member 8 with the light transmission plate 4 interposed therebetween. When the portion 69A of the claw 69 engages with the frame 34 of the case body 3 from the back, the cap cover 6 is also fixed to the case body 3, so that the light transmission plate 4 can better press and compress the elastic member 8 together with the second engagement unit.

As illustrated in FIG. 2, the restriction member 15 is constructed with a metal plate including an insertion hole 16 in which the screw members 13a, 13b can be inserted to fix the cap 5 to the case body 3. The restriction member 15 is pressed against the cap 5 using the screw members 13a, 13b, which fix the cap 5 to the case body 3, while connected to the cap cover 6, thereby restricting the sliding of the cap cover 6 with respect to the cap 5.

As illustrated in FIG. 21, the second engagement units (the first protrusion 57 and the second protrusion 66, and the fitting protrusion 58 and the fitting hole 68) of the cap cover 6 and the cap 5 strongly engage with each other by the repulsive force (restoring force) of the elastic member 8 while the cap cover 6 is attached to the cap 5 by the sliding. Therefore, the cap cover 6 hardly slides with respect to the cap 5 in a direction of an arrow Y in which the cap cover 6 is detached from the cap 5. However, when strong force acts on the cap cover 6 in the direction of the arrow Y by a certain influence, the cap cover 6 slides with respect to the cap 5, and there is a risk that the engagement of the second engagement unit is released. When the engagement of the engagement unit is released, the cap cover 6 receives the repulsive force (restoring force) from the elastic member 8 in the direction (forward) in which the cap cover 6 is separated from the cap 5, and the fixing between the cap cover 6 and the cap 5 is loosened. Resultantly, the state in which the elastic member 8 is pressed and compressed by the pressing member 9 with the light transmission plate 4 interposed therebetween cannot be maintained, and the opening 39 in the front face of the case body 3 cannot be closed well. Therefore, in the embodiment, the restriction member 15 restricts the sliding of the cap cover 6 with respect to the cap 5 after the cap cover 6 is attached to the cap 5.

Figure 19:
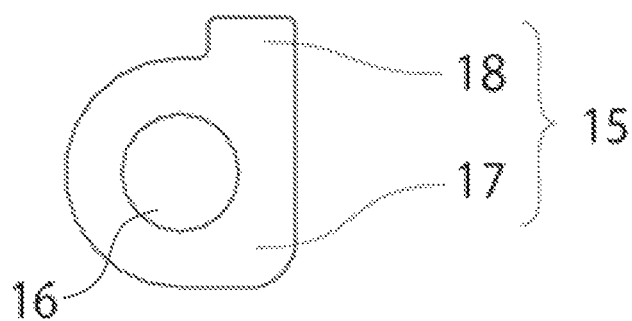
FIG. 19 is a plan view of a restriction member.
Figure 22:
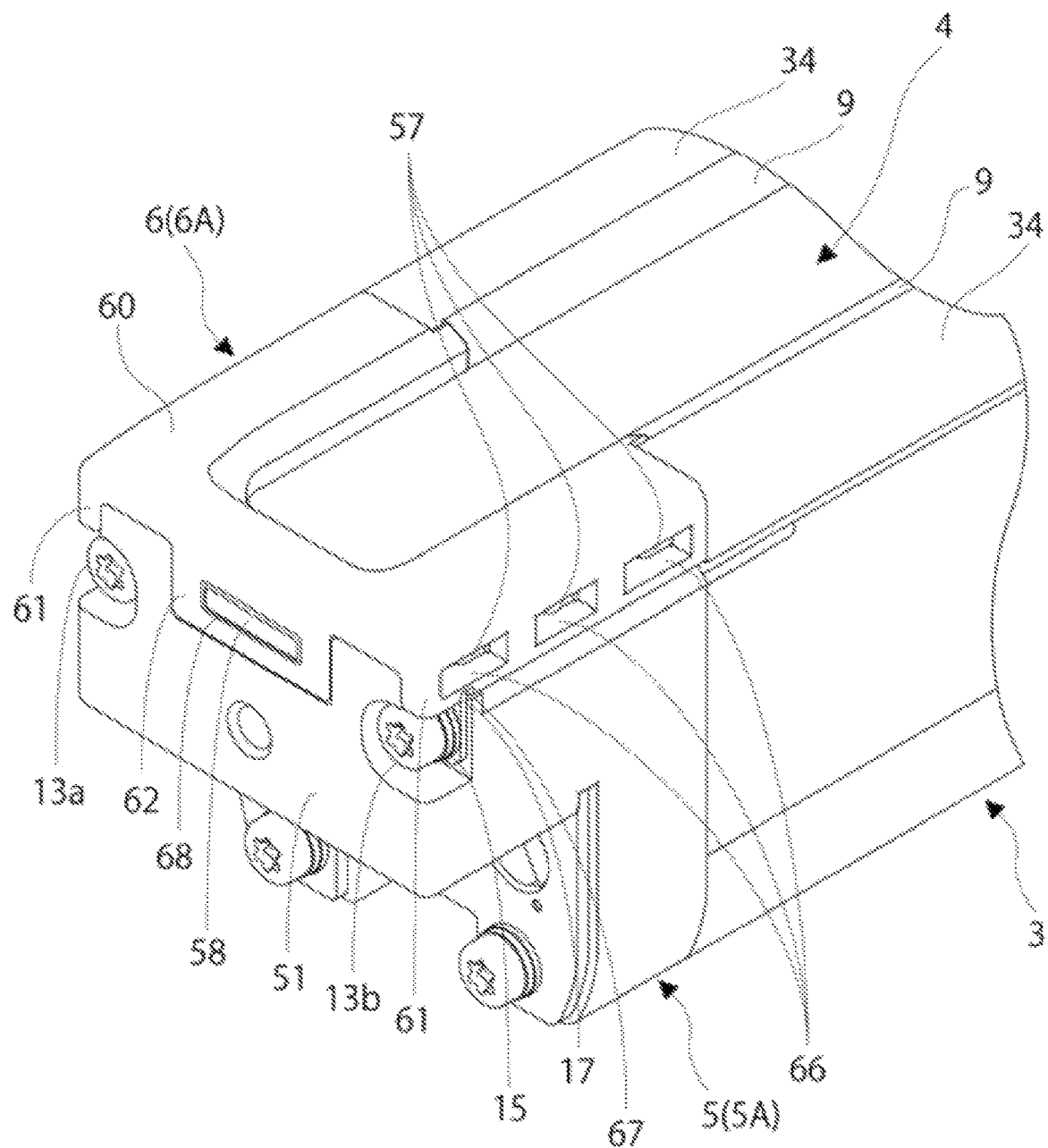
FIG. 22 is an enlarged perspective view illustrating the main part during the process of attaching the cap cover to the cap.

As illustrated in FIG. 19, the restriction member 15 in the embodiment includes a main body 17 having a substantially circular external form and a latch unit 18 protruding from an outer periphery of the main body 17. The main body 17 is rotatable about the screw members 13a, 13b, the latch unit 18 is fitted in the recessed groove 67 of the cap cover 6 from the state in FIG. 21 by the rotation of the main body 17 as illustrated in FIG. 22, whereby the restriction member 15 is connected to the cap cover 6. At this point, when the screw members 13a, 13b are screwed in the case body 3 to press the restriction member 15 against the cap 5, the state in which the restriction member 15 is connected to the cap cover 6 while the latch unit 18 is fitted in the recessed groove 67 of the cap cover 6 is maintained because the main body 17 becomes unrotatable. Therefore, the sliding of the cap cover 6 is restricted with respect to the cap 5.

Figure 12:
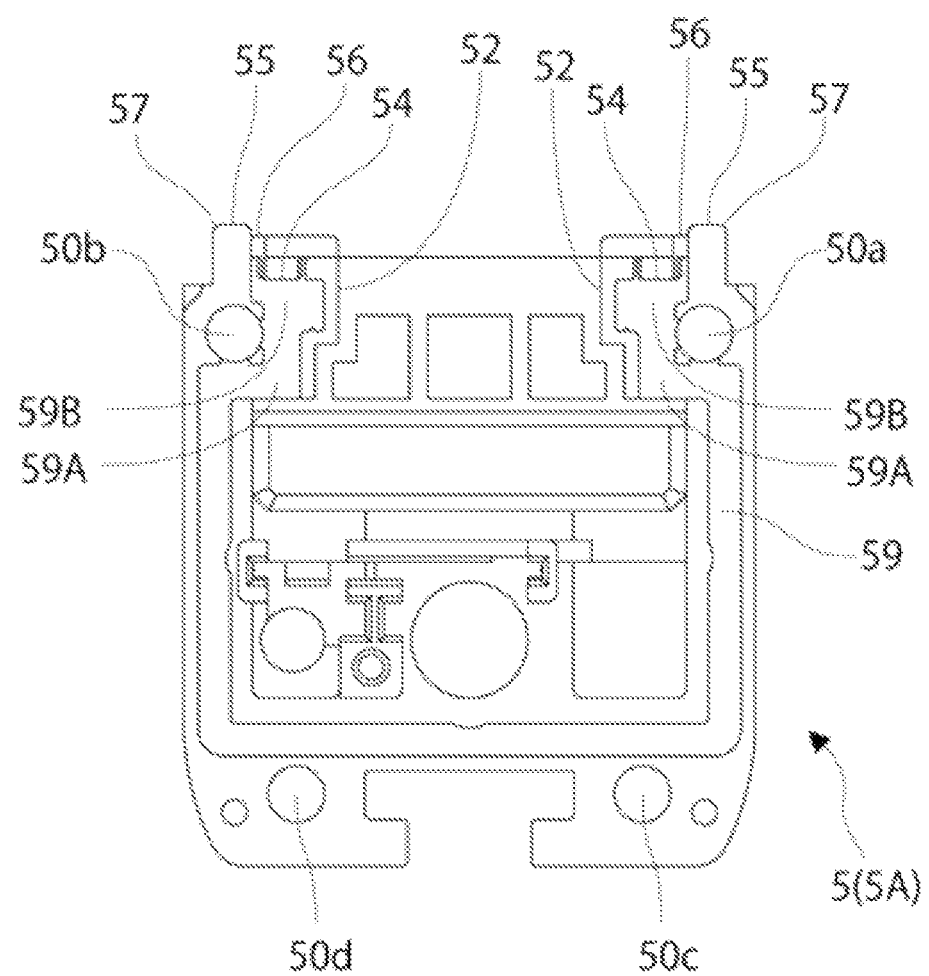
FIG. 12 is a plan view of the cap.
Figure 13:
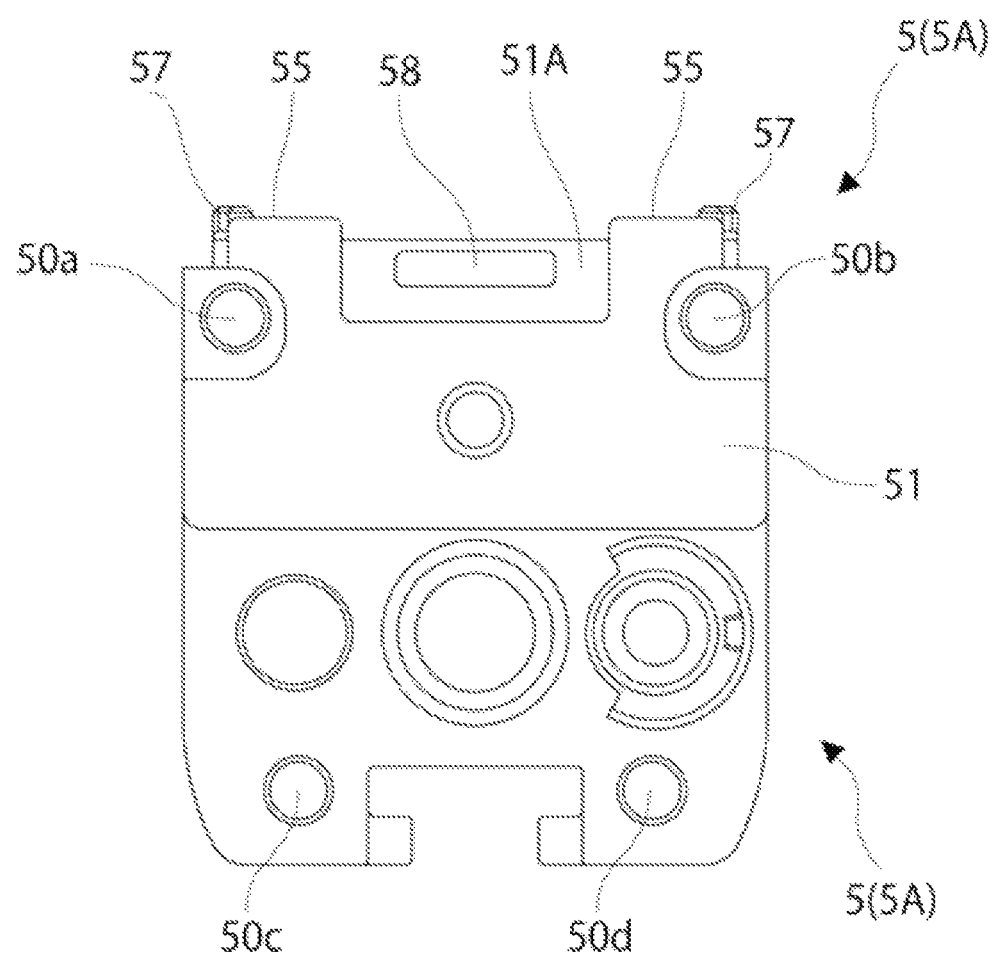
FIG. 13 is a bottom view of the cap.
Figure 14:
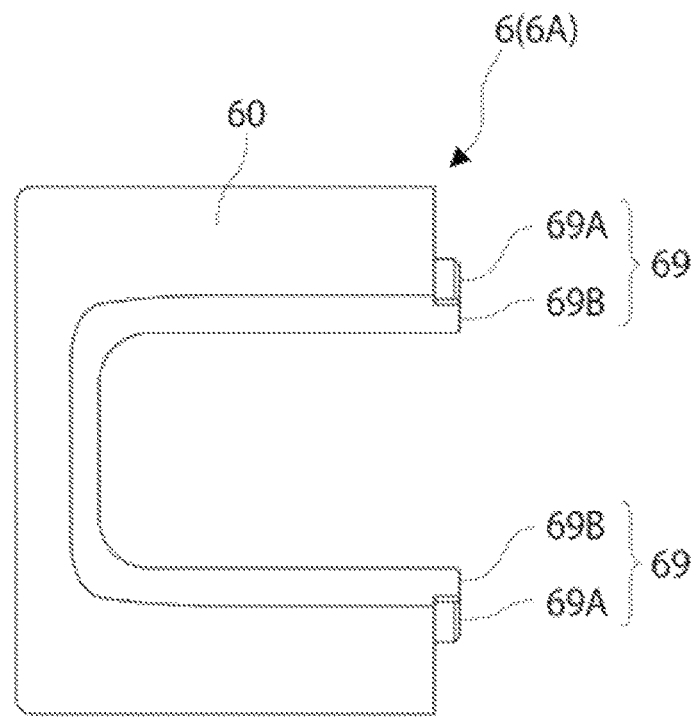
FIG. 14 is a front view of a cap cover.
Figure 15:
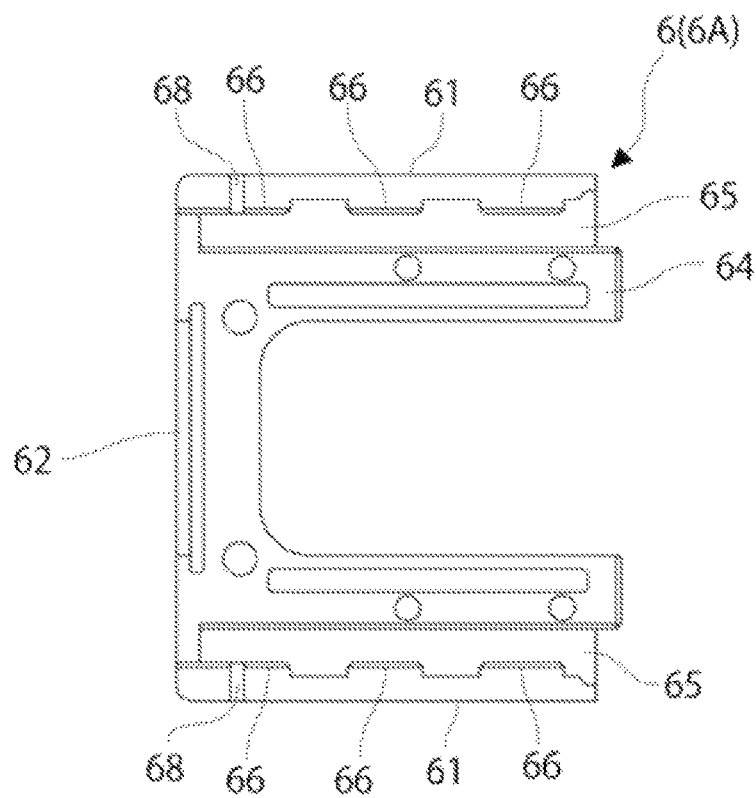
FIG. 15 is a rear view of the cap cover.
Figure 16:
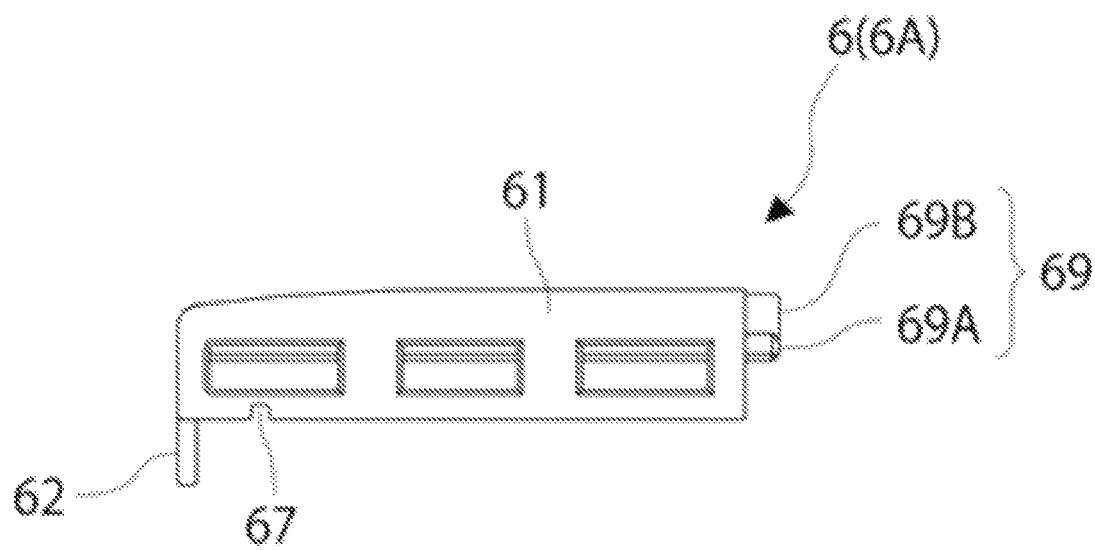
FIG. 16 is a side view of the cap cover.
Figure 17:
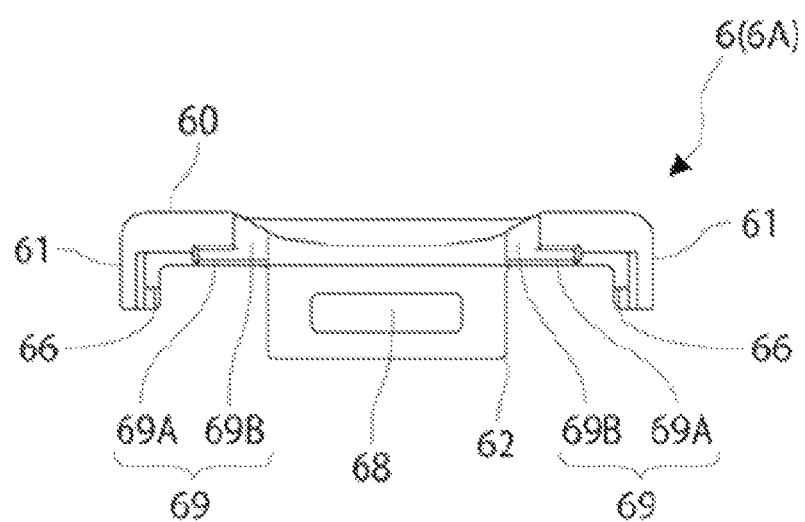
FIG. 17 is a plan view of the cap cover.
Figure 18:
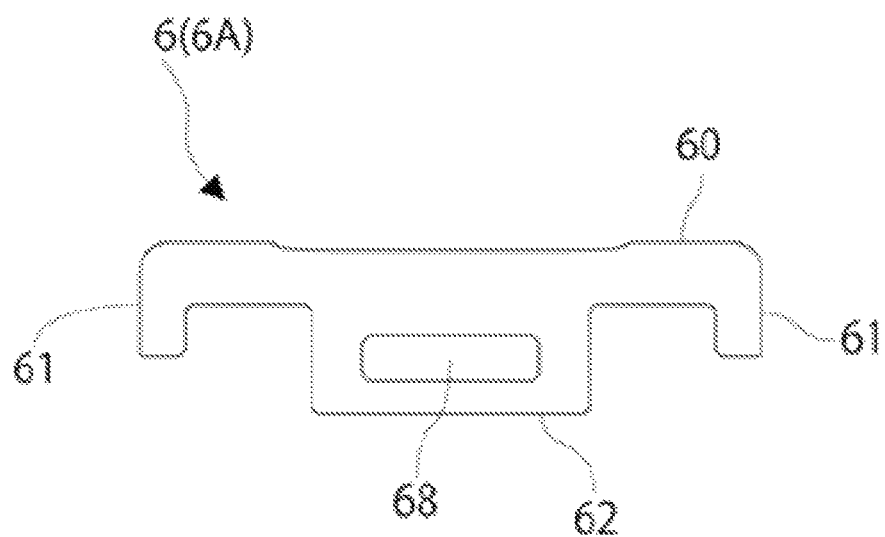
FIG. 18 is a bottom view of the cap cover.

As illustrated in FIG. 2, the seal member 7 interposed between the case body 3 and each cap 5 is formed into the substantial U-shape similar to that of the fitting groove 59 so as to be fitted in the fitting groove 59 of the cap 5 in FIG. 12. However, in the seal member 7, leading ends 71 of a pair of leading-end-side portion 70 bent inward into an L-shape are further leaned in in the embodiment. Specifically, the seal member 7 has the shape bent into the L-shape. When the seal member 7 is fitted in the fitting groove 59, a space is formed at a position adjacent to the accommodation groove 54 of each leading end 59B in the fitting groove 59 as illustrated in FIG. 6, and the leading ends of the seal member 7 do not abut on the elastic member 8 accommodated in the accommodation groove 54. In the embodiment, the space acts as a storage space for a liquid sealing agent 14, and the liquid sealing agent 14 is applied to and cured in the space. Therefore, the cured liquid sealing agent 14 is interposed between the leading ends of the seal member 7 and the elastic member 8. The leading ends of the seal member 7 and the elastic member 8 are connected to each other by the cured liquid sealing agent 14.

Generally the cured liquid sealing agent 14 is a liquid having fluidity at room temperature (also includes a liquid having viscosity). At the same time, when applied, the cured liquid sealing agent 14 is cured after a given time elapses, and changed to a solid having elasticity or adhesiveness. In addition to what is called a liquid gasket that is formed into a rubber elastic material when cured, a curable adhesive agent or a curable bonding agent can be cited as an example of the cured liquid sealing agent 14. Among others, the liquid gasket has proper viscosity and a shape retaining property that is necessary for the cured liquid sealing agent 14 until the cured liquid sealing agent 14 is cured. Therefore, the liquid gasket has a good working property. Examples of the liquid gasket include a material mainly containing a modified ester resin, a material mainly containing a phenol-based resin, a material mainly containing an acryl-based resin, and a material mainly containing a silicone-based resin.

As illustrated in FIG. 2, the elastic member 8 interposed between the light transmission plate 4 and the case body 3 and each cap 5 is formed into the ring shape, and accommodated in the accommodation groove 36 of each first support 35 and the accommodation groove 54 of each second support 53. The elastic member 8 is constructed with a string-shaped rubber in the embodiment. The string-shaped rubber has a length corresponding to a peripheral length of each of the accommodation grooves 36, 54 formed into a loop shape as a whole. After the string-shaped rubber is accommodated in each of the loop-shaped accommodation grooves 36, 54, both ends of the string-shaped rubber are coupled together using the cured liquid sealing agent having the adhesiveness to be formed into the ring shape. Both the ends of the string-shaped rubber are not necessarily coupled together using the cured liquid sealing agent. For example, the string-shaped rubber is formed slightly longer than each of the loop-shaped accommodation grooves 36, 54, the string-shaped rubber is accommodated in each of the accommodation grooves 36, 54 while the ends of the string-shaped rubber overlap each other, and the ends of the string-shaped rubber may be in close contact with each other by a repulsion between the overlapping ends of the string-shaped rubber.

The configuration of the multiple-optical-axis photoelectric sensor 1 in the embodiment is described above. In the multiple-optical-axis photoelectric sensor 1 of the embodiment, each cap 5 is fixed to the case body 3 without generating the gap therebetween by the seal member 7, and the light transmission plate 4 is fixed to the case body 3 without generating the gap therebetween by the elastic member 8. Additionally, the seal member 7 between the case body 3 and each cap 5 and the elastic member 8 between the light transmission plate 4 and the case body 3 are integrally connected to each other by the cured liquid sealing agent 14. This enables the light transmission plate 4, the case body 3, and each cap 5 to be assembled one another without generating the gap in the joints among the light transmission plate 4, the case body 3, and each cap 5. Accordingly, the opening 39 in the front face of the case body 3 and the openings 38 in the end faces are surely closed, and the casing 2 can be sealed more stably. Further, the cured liquid sealing agent 14 is applied and cured to connect the leading ends of the seal member 7 and the elastic member 8 to each other, so that the work can easily be performed. The cured liquid sealing agent 14 can be made to have various shapes and sizes, so that the leading ends of the seal member 7 and the elastic member 8 can surely and stably be connected to each other.

In the multiple-optical-axis photoelectric sensor 1 of the embodiment, the leading ends of the seal member 7 do not abut on the elastic member 8, and are connected to the elastic member 8 by the cured liquid sealing agent 14. Unless the cured liquid sealing agent 14 is interposed between the leading ends of the seal member 7 and the elastic member 8, the incomplete contact between the leading ends of the seal member 7 and the elastic member 8 is obviously recognized. Therefore, a lack of the application of the cured liquid sealing agent 14 can easily be found, and a defective product can be eliminated.

In the multiple-optical-axis photoelectric sensor 1 of the embodiment, the space is formed at the position adjacent to the accommodation groove 54 (second support 53) in the fitting groove 59 of the cap 5. Therefore, when the cured liquid sealing agent 14 is applied to and cured in the space, the cured liquid sealing agent 14 can surely be interposed between the leading ends of the seal member 7 and the elastic member 8.

In the multiple-optical-axis photoelectric sensor 1 of the embodiment, when the cap cover 6 is attached to the cap 5 by the sliding, the portion protruding from the end face of the case body 3 in the light transmission plate 4 is fixed to the second support 53 by the pressing unit 64 of the cap cover 6 while pressed against the elastic member 8 disposed between the pressing unit 64 and the second support 53 of the cap 5. Therefore, the opening 39 in the front face of the case body 3 can be closed well by the compressed elastic member 8. At this point, the cap cover 6 is fixed to the cap 5 by the engagement of the second engagement unit (the first protrusion 57 and the second protrusion 66, and the fitting protrusion 58 and the fitting hole 68) between the cap cover 6 and the cap 5 while the pressing unit 64 presses the light transmission plate 4. It is not necessary that the cap cover 6 be fixed to the cap 5 using screws, and the area (dead space) where the object cannot be detected in the longitudinal direction of the casing 2 of the light projector 10 and the light receiver 20 can be reduced by the space of the screw, so that the object detecting function can be improved in the multiple-optical-axis photoelectric sensor 1.

Even if strong force acts on the cap cover 6 by a certain influence in the opposite direction to the direction the cap cover 6 is slid to be attached to the cap 5, the restriction member 15 restricts the sliding of the cap cover 6 in the opposite direction with respect to the cap 5. Therefore, the cap cover 6 is fixed to the cap 5 without releasing the engagement of the second engagement unit (the first protrusion 57 and the second protrusion 66, and the fitting protrusion 58 and the fitting hole 68) between the cap cover 6 and the cap 5. Accordingly, the state in which the elastic member 8 is pressed and compressed by the light transmission plate 4 can be maintained.

Although the embodiment of the present invention is described above, the present invention is not limited to the above embodiment, and various changes can be made without departing from the scope of the present invention.

For example, in the above embodiment, the seal member 7 does not abut on the elastic member 8 because the leading ends 71 of the seal member 7 are bent inward into the L-shape, and the space to which the cured liquid sealing agent 14 can be applied is formed at the position adjacent to the accommodation groove 54 (second support 53) in each of the leading ends 59B of the fitting groove 59. Alternatively, the leading ends 71 of the seal member 7 are not bent inward into the L-shape, and the leading ends 71 are formed straight, and do not reach the accommodation groove 54 (second support 53), and therefore the leading ends 71 do not abut on the elastic member 8, whereby the space to which the cured liquid sealing agent 14 can be applied may be formed at the position adjacent to the accommodation groove 54 (second support 53) in each of the leading ends 59B of the fitting groove 59. In this case, it is not necessary to widen the leading ends 59B of the fitting groove 59.

In the above embodiment, the leading ends of the seal member 7 do not abut on the elastic member 8, and the leading ends of the seal member 7 are connected to the elastic member 8 by the cured liquid sealing agent 14 interposed between the leading ends of the seal member 7 and the elastic member 8. Alternatively, the leading ends of the seal member 7 may abut on the elastic member 8. Even in this case, when the cured liquid sealing agent 14 is interposed between the leading ends of the seal member 7 and the elastic member 8 (including surroundings of "between"), the leading ends of the seal member 7 and the elastic member 8 can surely be connected to each other using the cured liquid sealing agent 14 even if a position deviation or thermal expansion and contraction of the seal member 7 and/or the elastic member 8 or a variation in surface roughness or compression of the seal member 7 and the elastic member 8 is generated.

In the above embodiment, the seal member 7 is constructed with the previously-molded solid-state gasket such as a rubber packing. Alternatively, a solid-state gasket (cured liquid gasket), in which the liquid gasket is cured after a place to be sealed (the fitting groove 59 of each cap 5) is filled with the liquid gasket, may be used as the seal member 7. In this case, because the seal member 7 is formed by the application and the curing of the liquid gasket, the work is easily performed, and the productivity is improved.

In the above embodiment, the first protrusion 57 and the second protrusion 66, and the fitting protrusion 58 and the fitting hole 68 are provided in the cap 5 and the cap cover 6 as the second engagement unit. Alternatively, the first protrusion 57 and the second protrusion 66 or the fitting protrusion 58 and the fitting hole 68 may be provided. There is no particular limitation to the second engagement unit. The second engagement units having various configurations can be provided in the cap 5 and the cap cover 6 as long as the second engagement units engage with each other to fix the cap cover 6 to the cap 5 while the cap cover 6 presses the light transmission plate using the pressing unit 64. For example, a hook such as a step and a neck is provided in the sidewall 52 of the cap 5, a latch unit having a hook-shaped leading end engaging with the hook is provided in the side face 61 of the cap cover 6, and the latch unit engages with the hook when the cap cover 6 is attached to the cap 5, whereby the cap cover 6 may be fixed to the cap 5. A recess extending in the longitudinal direction is provided in the outer surface of the sidewall 52 of the cap 5, and a protrusion, which extends in the longitudinal direction and is fitted in the recess, is provided in the inner surface of the side face 61 of the cap cover 6. When the cap cover 6 is attached to the cap 5, the protrusion engages with the recess, whereby the cap cover 6 may be fixed to the cap 5.

Figure 23:
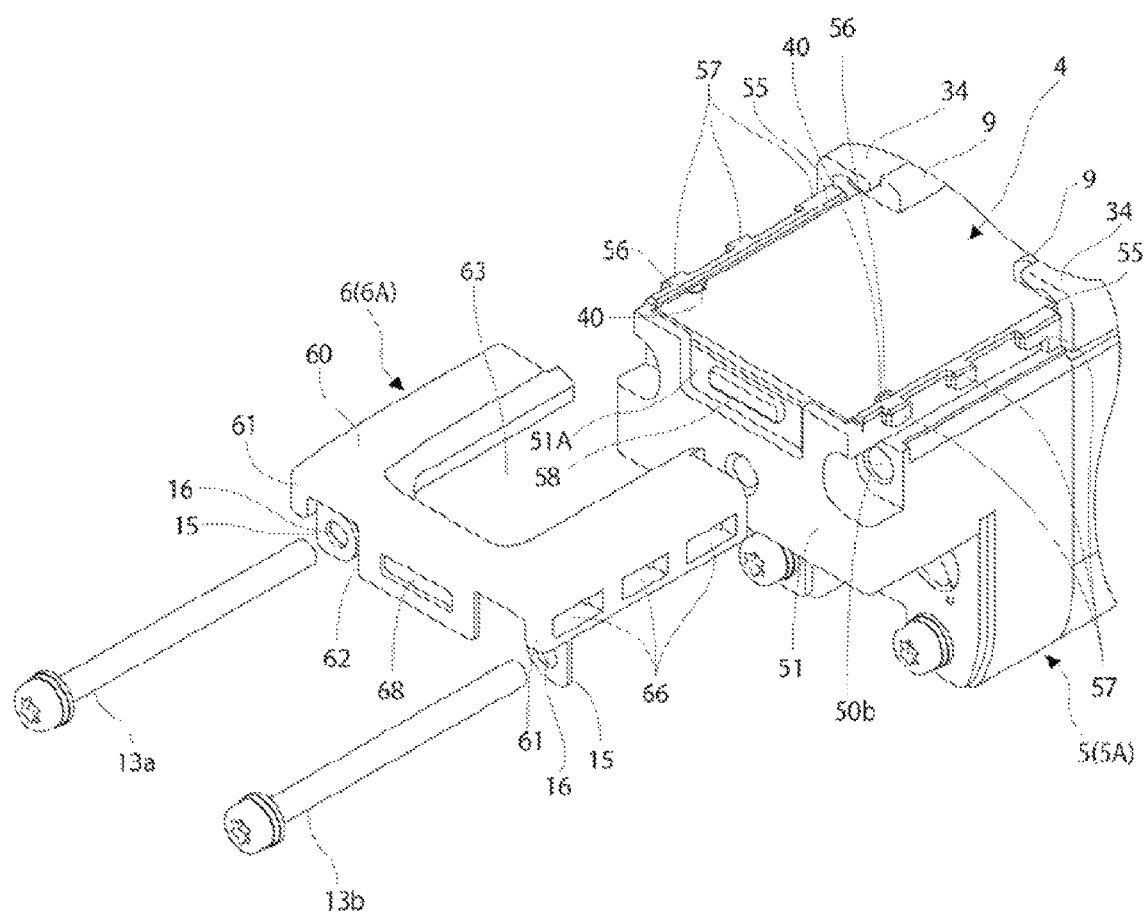
FIG. 23 is an enlarged perspective view illustrating the main part during the process of attaching the cap cover to the cap in another embodiment.
Figure 24:
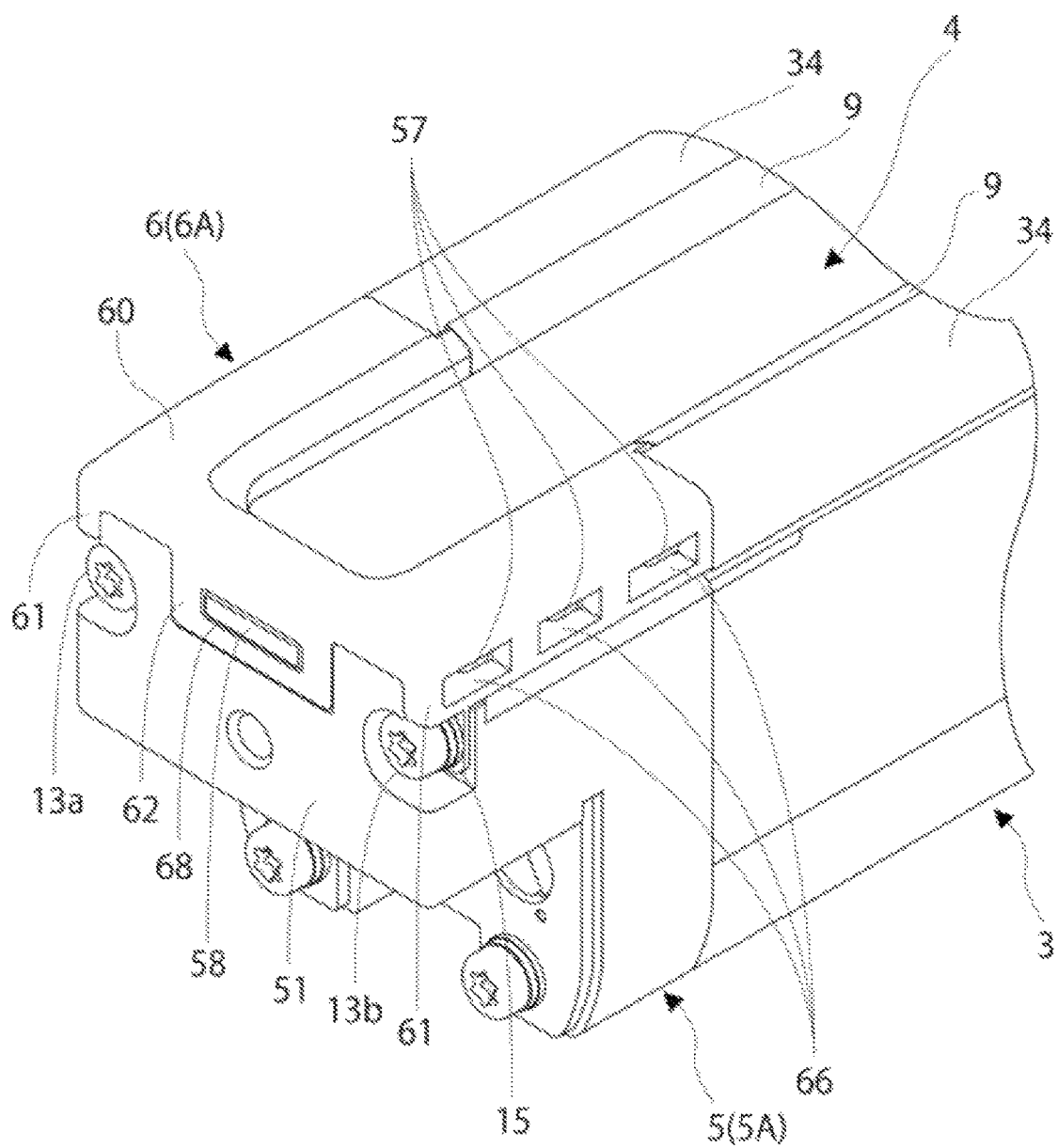
FIG. 24 is an enlarged perspective view illustrating the main part during the process of attaching the cap cover to the cap in another embodiment.

In the above embodiment, the restriction member 15 is configured as the member separated from the cap cover 6. Alternatively, as illustrated in FIG. 23, the restriction member 15 may be integral with the cap cover 6. In FIG. 23, the restriction member 15 including the insertion holes 16 is integral with the side face 61 of the cap cover 6. The restriction member 15 is positioned in the cap cover 6 such that the insertion holes 16 are aligned with the through-holes 50a, 50b of the cap 5 when the cap cover 6 is attached to the cap 5. As illustrated in FIG. 24, after the cap cover 6 is attached to the cap 5 by the sliding, the screw members 13a, 13b are screwed in the screw holes 33a, 33b of the case body through the insertion holes 16 of the restriction member 15 and the through-holes 50a, 50b of the cap 5, whereby the restriction member 15 is pressed against the cap 5. Therefore, the sliding of the cap cover 6 connected to the restriction member 15 is restricted with respect to the cap 5. The restriction member 15 may be integral with the end face 62 of the cap cover 6. The restriction member 15 is not necessarily provided.

In the above embodiment, the notch 40 and the engagement protrusion 56 are provided in the light transmission plate 4 and the cap 5 as the first engagement unit, respectively. However, the notch 40 and the engagement protrusion 56 are not necessarily provided.

In the above embodiment, the ring shape is formed by connecting the ends of one string-shaped elastic member 8 to each other. Alternatively, the ring shape may be formed by connecting the ends of two string-shaped elastic members 8 to each other, or the ring-shaped elastic member 8 may be used.

In the above embodiment, the elastic member 8 is accommodated in each of the accommodation grooves 36, 54 that are formed in the first and second supports 35, 53 of the case body 3 and the cap 5. Alternatively, the accommodation grooves 36, 54 are not provided in the first and second supports 35, 53, and the elastic member 8 may be disposed in each of the flat first and second supports 35, 53.

The invention claimed is:

1. A multiple-optical-axis photoelectric sensor comprising a light projector and a light receiver, wherein
    the light projector and the light receiver each comprise: a case body comprising openings in both end faces in a longitudinal direction and a front face through which light is passed; a light transmission plate that closes the opening in the front face of the case body, the light transmission plate being longer than the case body; and a pair of caps that closes the openings in both of the end faces of the case body,
    the case body comprises a pair of first supports that partially support both side edges of the light transmission plate,
    each cap of the pair of caps comprises a pair of second supports continuous with the pair of first supports, the pairs of second supports supporting portions of the light transmission plate protruding from both of the end faces of the case body,
    the light transmission plate is supported by the pair of first supports and the pairs of second supports with an elastic member interposed between the light transmission plate and the pair of first supports and the pairs of second supports,
    the pair of caps are fixed to the case body and each seal member of a pair of seal members abutting on the end face of the case body is interposed between each cap of the pair of caps and the case body, and
    a cured liquid sealing agent is interposed between a pair of L-shaped leading ends of each seal member of the pair of seal members and the elastic member.

2. The multiple-optical-axis photoelectric sensor according to claim 1, wherein the pair of L-shaped leading ends of each seal member of the pair of seal members do not abut on the elastic member, and are connected to the elastic member by the cured liquid sealing agent.

3. The multiple-optical-axis photoelectric sensor according to claim 2, wherein
    a fitting groove of a pair of fitting grooves in which a corresponding seal member of the pair of seal members is fitted is provided in each cap of the pair of caps,
    a pair of leading ends of each fitting groove of the pair of fitting grooves is communicated to the pairs of second supports, and
    a space adjacent to the pairs of second supports in each fitting groove of the pair of fitting grooves is filled with the cured liquid sealing agent.

4. The multiple-optical-axis photoelectric sensor according to claim 3, wherein
    the leading ends of the pair of leading ends of the fitting groove of the pair of fitting grooves are wider than other portions of the fitting groove of the pair of fitting grooves, and
    the L-shaped leading ends of the pair of L-shaped leading ends of each seal member of the pair of seal members are leaned in to form the space filled with the cured liquid sealing agent at a position adjacent to the pair of second supports at the pair of leading ends of each fitting groove of the pair of fitting grooves.

5. The multiple-optical-axis photoelectric sensor according to claim 1, wherein the L-shaped leading ends of the pair of L-shaped leading ends of each seal member of the pair of seal members abut on the elastic member.

6. The multiple-optical-axis photoelectric sensor according to claim 1, wherein each seal member of the pair of seal members is constructed with a cured liquid gasket.

* * * * *